US011334867B2

(12) United States Patent
Sharma et al.

(10) Patent No.: US 11,334,867 B2
(45) Date of Patent: May 17, 2022

(54) METHODS AND SYSTEMS FOR FACILITATING PAYMENT TRANSACTIONS AT POINT OF SALE TERMINALS

(71) Applicant: MASTERCARD INTERNATIONAL INCORPORATED, Purchase, NY (US)

(72) Inventors: Piyush Sharma, Pune (IN); Navneet Jain, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 31 days.

(21) Appl. No.: 16/430,423

(22) Filed: Jun. 4, 2019

(65) Prior Publication Data

US 2020/0027076 A1 Jan. 23, 2020

(30) Foreign Application Priority Data

Jul. 19, 2018 (SG) .............................. 10201806192P

(51) Int. Cl.
*G06Q 20/32* (2012.01)
*G06Q 20/38* (2012.01)
(Continued)

(52) U.S. Cl.
CPC ... *G06Q 20/3274* (2013.01); *G06K 19/06037* (2013.01); *G06Q 20/322* (2013.01);
(Continued)

(58) Field of Classification Search
CPC .. G06Q 20/3278; G06Q 20/20; G06Q 20/322; G06Q 20/3223; G06Q 20/3274;
(Continued)

(56) References Cited

U.S. PATENT DOCUMENTS 8,930,694 B2 * 1/2015 Fernandez de Torres ...................
H04L 63/08
713/168
9,965,760 B2 * 5/2018 Leber ................. G06Q 20/3276
(Continued)

FOREIGN PATENT DOCUMENTS

WO WO-2010008766 A3 * 3/2010 ............. G06Q 40/02

OTHER PUBLICATIONS

Cisa et al. A PKI Enabled Authentication Protocol for Secure E-Payment Framework. Journal of Telecommunication, Electronic and Computer Engineering. ISSN: 2180—1843 e-ISSN: 2289-8131 vol. X No. X. Jan. 2017. (Year: 2017).*

(Continued)

*Primary Examiner* — Virpi H Kanervo

(57) ABSTRACT

Embodiments provide a method for facilitating a payment transaction at a POS terminal. The method includes receiving, by a server system associated with a payment network, a machine-readable code comprising information corresponding to a merchant and a dynamic token. The machine-readable code is valid for only a pre-defined interval. The method includes sending, by the server system, a notification associated with the machine-readable code received from the customer device, to a merchant device for approval of the payment transaction. The method further includes receiving, by the server system, a merchant defined transaction code from the merchant device in response to receipt of the notification at the merchant device. The merchant defined transaction code indicates a nature of the payment transaction. facilitating, by the server system, the payment transaction upon receipt of the merchant defined transaction code from the merchant device.

20 Claims, 14 Drawing Sheets

(51) Int. Cl.
*G06Q 20/40* (2012.01)
*G06K 19/06* (2006.01)

(52) U.S. Cl.
CPC ....... *G06Q 20/3823* (2013.01); *G06Q 20/401* (2013.01); *G06Q 2220/00* (2013.01)

(58) Field of Classification Search
CPC ............. G06Q 20/3823; G06Q 20/401; G06Q 2220/00; G06K 19/06037
See application file for complete search history.

(56) References Cited

U.S. PATENT DOCUMENTS

| | | | | |
|---|---|---|---|---|
| 10,489,763 | B2* | 11/2019 | Kamat | G06Q 20/202 |
| 2014/0344153 | A1* | 11/2014 | Raj | G06Q 20/385 |
| | | | | 705/44 |
| 2015/0052064 | A1* | 2/2015 | Karpenko | G06Q 20/3227 |
| | | | | 705/71 |
| 2015/0154597 | A1* | 6/2015 | Bacastow | G06Q 20/322 |
| | | | | 705/72 |
| 2016/0005023 | A1* | 1/2016 | Soundararajan | G06Q 30/0637 |
| | | | | 705/39 |
| 2017/0061428 | A1* | 3/2017 | Prabhu | G06Q 50/01 |
| 2017/0236118 | A1* | 8/2017 | Laracey | G06Q 20/4014 |
| | | | | 705/44 |
| 2018/0357629 | A1* | 12/2018 | Maheshwari | G06Q 50/12 |
| 2020/0051073 | A1* | 2/2020 | Poole | G06Q 20/382 |

OTHER PUBLICATIONS

V. Malathi, B. Balamurugan and S. Eshwar, "Achieving Privacy and Security Using QR Code by Means of Encryption Technique in ATM," 2017 Second International Conference on Recent Trends and Challenges in Computational Models (ICRTCCM), 2017, pp. 281-285, doi: 10.1109/ICRTCCM.2017.36. (Year: 2017).*

* cited by examiner

| NATURE OF TRANSACTION | MERCHANT DEFINED CODE |
|---|---|
| AUTHENTICATE | 11 |
| PURCHASE/PAY | 12 |
| VOID | 14 |
| REFUND | 21 |
| PAY WITH CASHBACK | 25 |
| PAY WITH LOYALTY POINTS | 27 |
| PAY WITH CASH | 32 |
| ⋮ | ⋮ |

METHODS AND SYSTEMS FOR FACILITATING PAYMENT TRANSACTIONS AT POINT OF SALE TERMINALS

CROSS REFERENCE TO RELATED APPLICATION

This application claims priority to Singapore Patent Application No. 10201806192P, filed Jul. 19, 2018, entitled "Methods and Systems for Facilitating Payment Transactions at Point of Sale Terminals", the entirety of which is incorporated herein by reference.

TECHNICAL FIELD

The present disclosure relates to payment transactions and, more particularly to, methods and systems for payment transactions performed at point of sale (POS) terminals.

BACKGROUND

Point of sale transactions are ubiquitous these days. In a typical POS transaction, a cardholder presents his payment card to a merchant, who uses a card reader present in a merchant terminal to read the cardholder's payment account information. The merchant terminal, then, transmits the payment account information along with transaction details to a payment network for authorization, clearing and settlement. While this approach has worked well, there are disadvantages associated with it.

Fraud associated with payment cards is a topic of concern throughout the payment industry. The data in the payments cards of cardholders can be easily skimmed and copied from the POS devices. In most scenarios, agents employed by the merchant may directly skim cardholder data from payment cards and POS devices and use it for fraudulent transactions. In such scenarios, for payment transactions involving payment cards, threat concerning skimming of the payment card data of cardholders will continue to exist with existing security systems.

Moreover, unauthorized sources (such as hackers) may extract both merchant data and cardholder data from the POS terminal's data traffic by illegally installing monitors on the merchant's networks and phone lines. In some cases, a person having inside knowledge of a POS system may hack information from POS terminals. In the current payment transaction scenario, POS data such as card acceptor terminal ID (POS ID), merchant details, merchant ID, etc., are fixed which can be a major cause of such frauds. Fixed data is easily interceptable and can be grabbed by technically savvy criminals in the middle of the transaction from a POS system for performing fraudulent activities.

Accordingly, there appears to be a need for a technique that will make interception of POS related data from the terminal's data traffic difficult, thereby preventing and mitigating frauds.

SUMMARY

Various example embodiments of the present disclosure provide methods, systems, user devices and computer program products for facilitating payment transactions at a merchant terminal using machine-readable codes. The merchant terminal is configured with dynamic machine-readable code settings that can generate new machine-readable codes at pre-defined intervals.

An embodiment provides a method for facilitating a payment transaction at a POS terminal. The method includes receiving, by a server system associated with a payment network, a machine-readable code comprising information corresponding to a merchant and a dynamic token. The machine-readable code is valid for only a pre-defined interval. The method includes sending, by the server system, a notification associated with the machine-readable code received from the customer device, to a merchant device for approval of the payment transaction. The method further includes receiving, by the server system, a merchant defined transaction code from the merchant device in response to receipt of the notification at the merchant device. The merchant defined transaction code indicates a nature of the payment transaction. The method also includes facilitating, by the server system, the payment transaction upon receipt of the merchant defined transaction code from the merchant device.

Another embodiment provides a server system for facilitating a payment transaction at a POS terminal. The server system includes a memory comprising stored instructions and a processor configured to execute the stored instruction and thereby cause the server system to receive, from a customer device, a machine-readable code comprising at least information corresponding to a merchant and a dynamic token. The machine-readable code is valid for only a pre-defined interval. The server system is further caused to send a notification associated with the machine-readable code received from the customer device, to a merchant device for approval of the payment transaction. The server system is further caused to receive a merchant defined transaction code from the merchant device in response to receipt of the notification at the merchant device. The merchant defined transaction code indicates a nature of the payment transaction. The server system is further caused to facilitate the payment transaction upon receipt of the merchant defined transaction code from the merchant device.

Another embodiment provides a merchant terminal for facilitating a payment transaction. The merchant terminal includes a memory comprising stored instructions and a processor executing the stored instructions and thereby causing the merchant terminal to display a machine-readable code for a customer to scan the machine-readable code using an application present in a customer device. The machine-readable code comprises information corresponding to a merchant and a dynamic token and is valid for a pre-defined duration. The merchant terminal is further caused to receive a notification associated with the machine-readable code from a server system associated with a payment network, wherein the server system sends the notification in response to receipt of the machine-readable code at the server system from the customer device upon scanning the machine-readable code by the customer device. The merchant terminal is further caused to receive from an agent associated with the merchant, a merchant defined transaction code indicating a nature of a payment transaction intended at the merchant terminal. The merchant terminal is further caused to send receiving from an agent associated with the merchant, a merchant defined transaction code indicating a nature of a payment transaction intended at the merchant terminal.

BRIEF DESCRIPTION OF THE FIGURES

For a more complete understanding of example embodiments of the present technology, reference is now made to the following descriptions taken in connection with the accompanying drawings in which.

Figure 1:
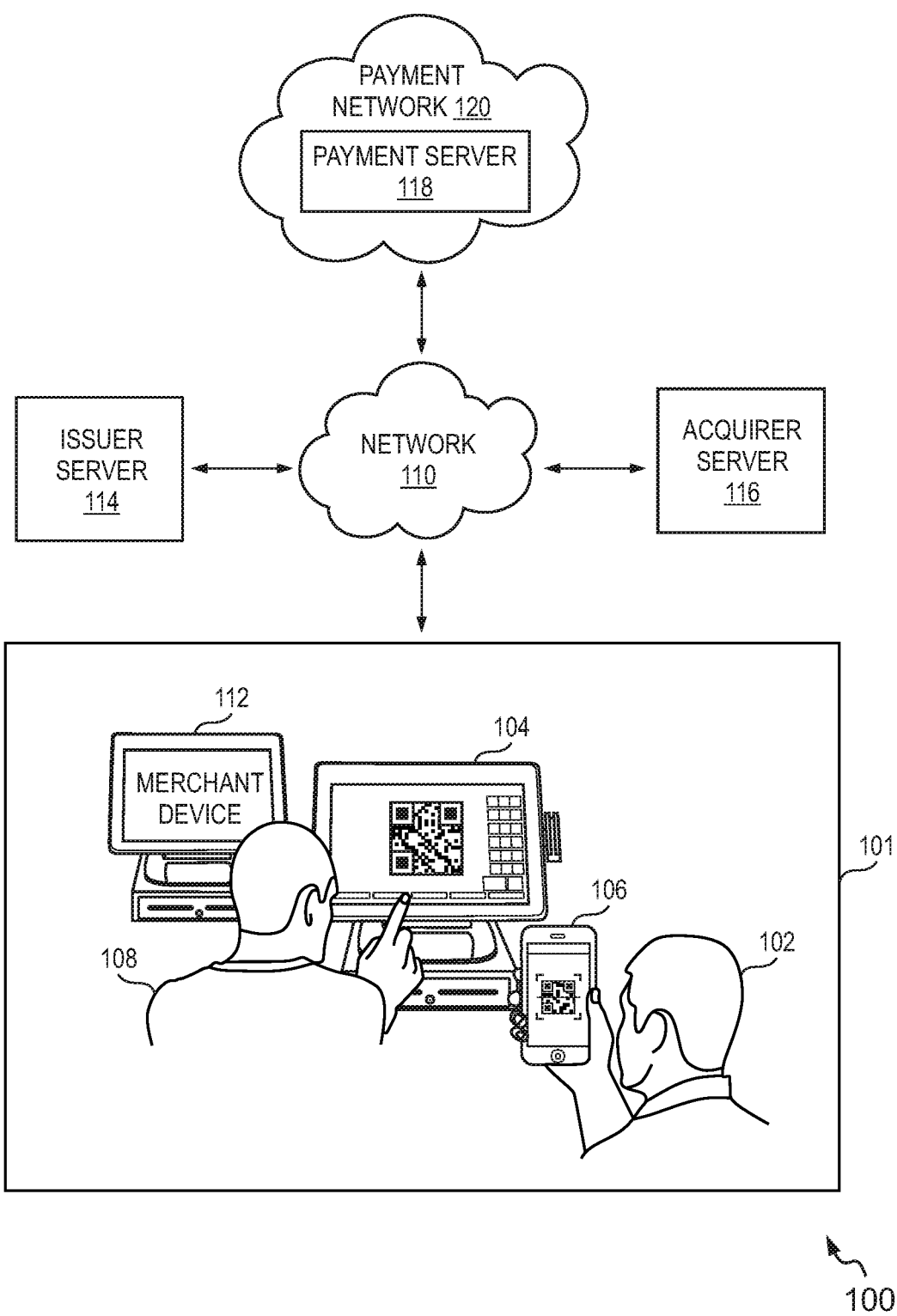
FIG. 1 illustrates an exemplary representation of an environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer account" used throughout the description refers to a financial account that is used to fund the financial transaction (interchangeably referred to as "payment transaction"). Further, the "acquirer account" used throughout the description refers to a financial account of a merchant or any entity which receives the fund from the issuer account. Examples of the issuer account and the acquirer account include, but are not limited to a savings account, a credit account, a checking account and a virtual payment account. Each of the issuer account and the acquirer account may be associated with an entity such as an individual person, a family, a commercial entity, a company, a corporation, a governmental entity, a non-profit organization and the like. In some scenarios, an issuer or acquirer account may be a virtual or temporary payment account that can be mapped or linked to a primary payment account, such as those accounts managed by PayPal®, and the like.

The term "payment card", used throughout the description, refer to a physical or virtual card linked with a financial or payment account that may be presented to a merchant or any such facility in order to fund a financial transaction via the associated payment account. Examples of the payment card include, but are not limited to, debit cards, credit cards, prepaid cards, digital wallets such as Google Pay® or Samsung Pay®, virtual payment numbers, virtual card numbers, forex card, charge cards and stored-value cards. A payment card may be a physical card that may be presented to the merchant for funding the payment. Alternatively or additionally, the payment card may be embodied in form of data stored in a user device, where the data is associated with payment account such that the data can be used to process the financial transaction between the payment account and a merchant's financial account.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Overview

Various example embodiments of the present disclosure provide methods, systems, user devices and computer program products for facilitating payment transactions at a merchant terminal using machine-readable codes. The merchant terminal is configured with dynamic machine-readable code settings that can generate new machine-readable codes at pre-defined intervals.

In various example embodiments, the present disclosure provides merchant terminals/POS terminals that can facilitate payment transactions by scanning dynamic machine readable code using user mobile devices at a merchant facility associated with a merchant. An application installed at a user device and managed by a server system is accessed to scan a machine-readable code such as a QR code displayed at the POS terminal. The machine-readable code encrypts information such as a merchant ID, merchant details and a dynamic token. The dynamic token is representative of a certificate validation indicating that the user device and the POS terminal are linked based on a pair of encryption keys. The POS terminal executes instructions to change the information encrypted within the QR code (merchant ID, merchant details and dynamic token) and generate and display new QR codes at pre-defined intervals at the POS terminal. A transaction amount associated with a current purchase to be paid to a merchant account of a merchant from an issuer account of a customer may be entered by the customer in the application. Upon scanning the machine-readable code displayed at the POS terminal and upon entering the transaction amount in the application, the server system sends a notification associated with the machine-readable code to a merchant device or the POS terminal. The merchant device and the POS terminal may be connected by means of a wireless or a wired connection and can exchange information. The POS terminal and the merchant device are operated by an agent associated with the merchant. In some embodiments, the merchant device and the POS terminal are same unit.

The merchant or an agent representing the merchant identifies the transaction intended/initiated at the POS terminal and enters a transaction code at the merchant device or the POS terminal. The transaction code indicates or defines the nature/type of transaction initiated at the POS terminal, and it is generally pre-defined and stored in a merchant database. As an example, five different types of transaction, such as, purchase, authentication, refund, void and purchase with cashback may be initiated at the POS terminal. The merchant defines a transaction code (numeric code) to each type of transaction. As an example, a 'purchase' is identified by a numeric code '11', 'authentication' is identified by a code '12' and so on. The provision of the transaction code by the agent at the merchant device or the POS terminal completes the transaction.

The POS terminal and/or the merchant device and the user device are in synchronization based on a public key-private key relationship managed by the server system. A public key validated by the server system is provided to the POS terminal and a private key validated by the server system is provided to the application facilitated at the user device. The user device is linked to the application and hence is identified as registered user device by the POS terminal and/or the merchant device based on the public key-private key relationship. Interaction between the public and the private key validates the transaction at the POS terminal. Only a registered user device is able to fetch the information encrypted within the machine-readable code.

FIG. 1 illustrates an exemplary representation of an environment 100, in which at least some example embodiments of the present disclosure can be implemented. In the illustrated embodiment, a merchant facility 101 is shown as equipped with a merchant terminal/POS terminal 104. As seen in FIG. 1, the POS terminal 104 is operated by an agent 108 for performing payment transactions on behalf of a customer 102. The customer 102 is depicted as operating a customer device 106 (also referred to as device 106). The POS terminal 104 as depicted in the environment 100 is an example of a computing device within which a merchant computer, a POS card reader component, a printer component, a barcode scanner component, among other components are embodied. The POS terminal 104 as depicted in FIG. 1 has computing capabilities and includes instructions and settings for generation and display of machine-readable codes. It shall be noted that in some instances the term POS terminal 104 may refer to the merchant computer while all other components such as, the POS card reader component, the printer component, the barcode scanner component may be connected to the merchant computer as peripheral devices.

The environment 100 is further depicted as including a merchant device 112. Examples of the merchant device 112 include, but are not limited to, a smartphone, a tablet, a personal digital assistant (PDA), a notebook, etc. As seen in FIG. 1, the merchant device 112 is also operated by the agent 108. The merchant device 112 may be associated with a merchant database which includes information corresponding to the merchant, transaction history, merchant defined transaction codes and dynamic tokens. The merchant device 112 may be in operative communication with an acquirer server (see acquirer server 116) associated with a merchant's bank account. In another embodiment, the merchant device 112 and the POS terminal 104 may be one single hardware unit/system and may be referred to as a merchant computer or a merchant terminal. It shall be noted that the functionalities of the merchant device 112 can be performed by the POS terminal 104 as well.

Examples of the customer device 106 include, but are not limited to, a smartphone, a tablet, a personal digital assistant (PDA), a notebook, etc. As an example, the customer device 106 of FIG. 1 is depicted as a smartphone. However, it shall be understood that, the customer device 106 is not limited to a smartphone and can include any electronic devices of the likes of a smartphone and having the capability to allow installation of third party applications and communicate with other devices via a network 110. In the present disclosure, the customer device 106 may preferably be a mobile electronic device (such as a smartphone or a tablet) including a camera or a scanner.

Examples of the merchant facility 101 may include any retail shop, supermarket or establishment, government and/or private agencies, ticket counters, parking lots, toll gates, or any such place or establishment where customers visit for performing financial transactions in exchange of any goods and/or services or any transaction that requires financial transaction between the customers and the merchant. As can be seen from the environment 100, the customer 102 is making the financial transaction at the POS terminal 104. It shall be noted that more than one such POS terminals and merchant devices can be present in the merchant facility 101.

In the example environment 100, the POS terminal 104 is configured to accommodate display of a machine-readable code as seen in FIG. 1. The machine-readable code, as an example, is a quick response (QR) code scannable by external devices (such as the customer device 106) including scanner and/or camera. Upon his turn, the customer 102 walks up to the POS terminal 104 and accesses an application on his customer device 106. The application is managed by a server system associated with a payment network 120. The machine-readable code may be scanned using the customer device 106 through the application. Upon scanning the code, the POS terminal 104, the merchant device 112 and the server system validates a pair of encryption keys managed by the server system to determine whether the POS terminal 104 and the customer device 106 are in synchronization and are allowed to exchange sensitive data. A notification associated with the machine-readable code is then forwarded to the merchant device 112 or the POS terminal 104 by the server system.

Among other information, the machine-readable code includes merchant data such as Merchant ID, merchant details, merchant name and address, etc. Further, the machine-readable code includes a dynamic token. The dynamic token may be an alphanumeric code/token representative of a certificate associated with a public key issued by the server system to the POS terminal 104. The certificate or the public key issued to the POS terminal 104 is linked with a validated private key issued and managed by the server system to the customer device 106 by means of the application installed at the customer device 106. The public key-private key pair is referred to herein as the pair of encryption keys.

The content of the machine-readable code, and more particularly, the dynamic token, changes at pre-defined intervals based on settings defined at the POS terminal 104. When the pre-defined interval lapses, the POS terminal 104 alters the information such as the merchant details, merchant ID and the dynamic token included in the machine-readable code, generates a new machine-readable and displays the new machine-readable code.

Upon scanning of the machine-readable code, a payment transaction between the user 102 (issuer account) and the merchant (acquirer account) may be facilitated by the server system and the payment network 120. Examples of the server system include an issuer server 114, an acquirer server 116 and a payment server 118. In some cases, the issuer server 114, the acquirer server 116 and the payment server 118 can be a single entity, or any two of these servers may be a single entity.

The issuer server 114 is associated with a financial institution normally called as an "issuer bank" or "issuing bank" or simply "issuer" or simply "bank", in which the user 102 may have an issuer account. The issuer server 114 is responsible for managing an issuer portal/website (not shown) of the issuer in which the customer 102 has an issuer account. The issuer server 114 is further responsible for managing user information of the customer 102. The issuer server 114 includes an issuer database (not shown) for maintaining information such as one or more issuer accounts of the customer 102, transaction history related information, permanent account number (PAN) with which the one or more issuer accounts are linked, etc. To complete a payment transaction, the issuer server 114 authenticates the customer 102 and debits funds from the issuer account of the customer 102. The payment may be passed to an acquirer account associated with the merchant to complete the payment transaction.

The acquirer server 116 is associated with a financial institution normally called as an "merchant bank" or the "acquiring bank" or "acquirer bank" or simply "acquirer", in which the merchant may have account. The acquirer server 116 is responsible for managing merchant account details and processing settlement of funds received from an issuer account of the customer 102. In an embodiment, the environment 100 may include a plurality of acquirers associated with the one or more merchants. Similarly, the environment 100 may include a plurality of issuers.

In one embodiment, the payment server 118 is associated with the payment network 120. The payment network 120 may be used by payment cards issuing authorities as a payment interchange network. Examples of payment interchange network include, but not limited to, Mastercard® payment system interchange network. The Mastercard® payment system interchange network is a proprietary communications standard promulgated by Mastercard® International Incorporated for the exchange of financial transaction data between financial institutions that are members of Mastercard® International Incorporated. (Mastercard is a registered trademark of Mastercard International Incorporated located in Purchase, N.Y.).

The payment server 118 may facilitate accessing a mobile application in the device 106. In an example embodiment, the customer device 106 may be equipped with an instance of the application installed therein. The application and its components rest in the payment server 118. The application is a set of computer executable codes configured to perform the method disclosed herein. The set of computer executable codes may be stored in a non-transitory computer-readable medium of the customer device 106. The application installed on the customer device 106 facilitates an application interface (see 202 in FIG. 2) to enable communication of the device 106 with the payment server 118.

Using the payment network 120 the computers of the acquirer 116 or merchant device 112 will communicate with the computers of the issuer 114 to determine whether the customer's issuer account is in good standing and whether a purchase is covered by the customer's available credit line or account balance. Based on these determinations, the payment transaction is generally performed.

The issuer server 114, the acquirer server 116 and the payment server 118 communicate with one another using a network 110. Further the customer device 106, the payment server 118 and the issuer server 114 communicate with one another using the network 110. Examples of the network 110 may include any type of wired network, wireless network, or a combination of wired and wireless networks. A wireless network may be a wireless local area network ("WLAN"), a wireless wide area network ("WWAN"), or any other type of wireless network now known or later developed. Additionally, the network 110 may be or include the Internet, intranets, extranets, microwave networks, satellite communications, cellular systems, personal communication services ("PCS"), infrared communications, global area networks, or other suitable networks, etc., or any combination of two or more such networks.

Figure 2:
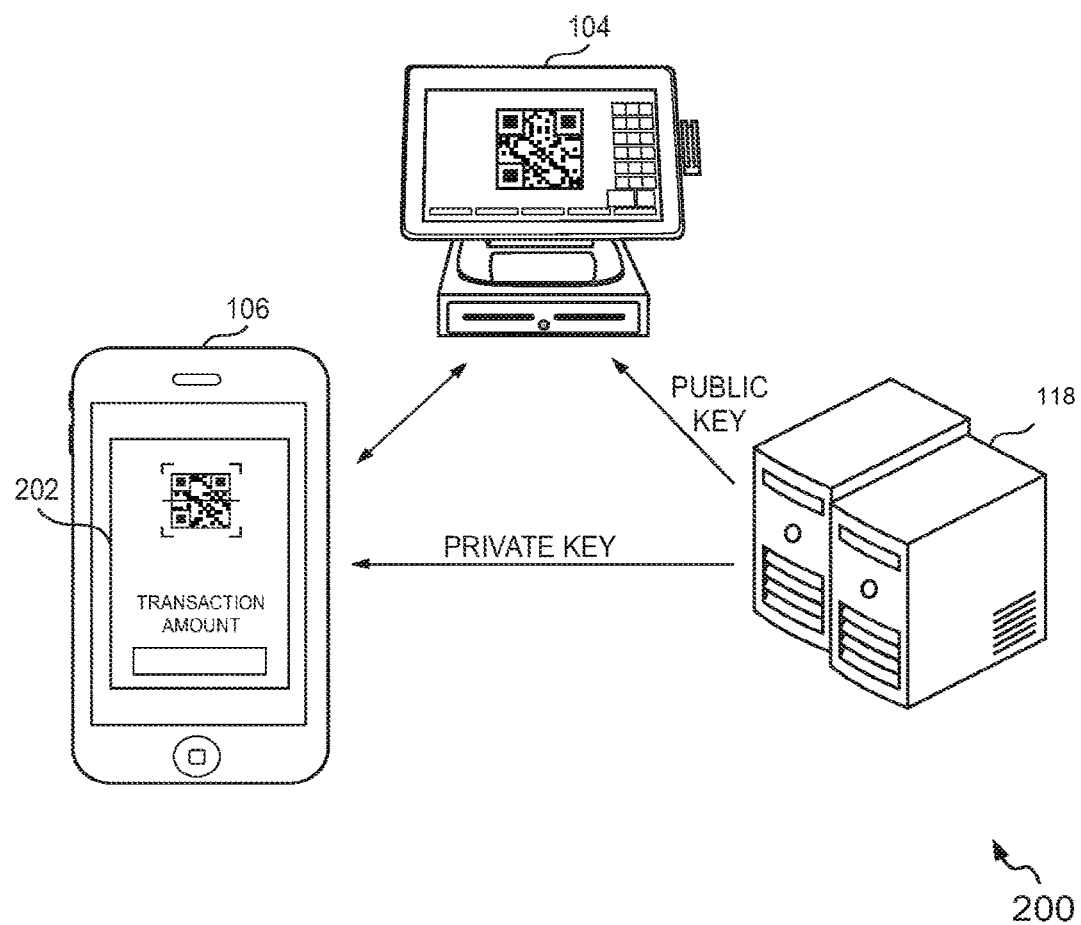
FIG. 2 is a representation of the payment server managing a pair of encryption keys linking the POS terminal and the customer device, in accordance with an example embodiment of the present disclosure.

FIG. 2 is a representation 200 of the payment server 118 managing a pair of encryption keys linking the POS terminal 104 and the customer device 106, in accordance with an example embodiment. The representation 200 depicts the payment server 118 as managing a public key-private key partnership or a validated certificate which links POS terminal software or operating system to the customer device 106 by means of the mobile application installed in the customer device 106. In this case, a public authenticated key validated by the payment server 118 is provided at the POS terminal 104. Also, a private key, which validates the public key shall be present in the mobile application. Interaction between the public and the private key validates the transaction at the POS terminal 104. Based on the public key-private key partnership, a device (such as the customer device 106) where the application is installed can be identified as validated/registered device by the POS terminal 104.

As depicted in FIG. 2, the application presents an interface 202 which allows the customer 102 to capture a machine-readable code displayed at the POS terminal 104. The application accesses the device's camera to enable capturing of the machine-readable code. As an example, opening the application in the device 106 presents an actionable icon (not shown) in the interface 202. Selection of the actionable icon opens the viewfinder of the camera. The customer 102 can then capture an image of the machine-readable code displayed at the POS terminal 104. The application and the POS terminal 104 are linked by means of private key-public key partnership managed by the payment server 118. Based on the public key-private key partnership managed by the payment server 118, the information encrypted within the machine-readable code can be fetched and read by the customer device 106 in the application. It shall be noted that the customer device 106 and the application are linked upon installation of the application in the customer device 106. The application accesses various features and data stored in the customer device 106 as a part of acceptance of the terms and conditions, which the customer 102 may have agreed while registering his/her credentials, such as a name and contact information with the application. Once registered, the customer 102 can be identified via his credentials.

As also seen in FIG. 2, interface 202 additionally provides a field where a transaction amount associated with a current purchase can be entered. The customer 102 enters the transaction amount in the respective field and the transaction amount is forwarded to the merchant device 112 by the payment server 118. The merchant device 112 further forwards the same to the acquirer server 116 for processing of the payment.

Figures 3, 4:
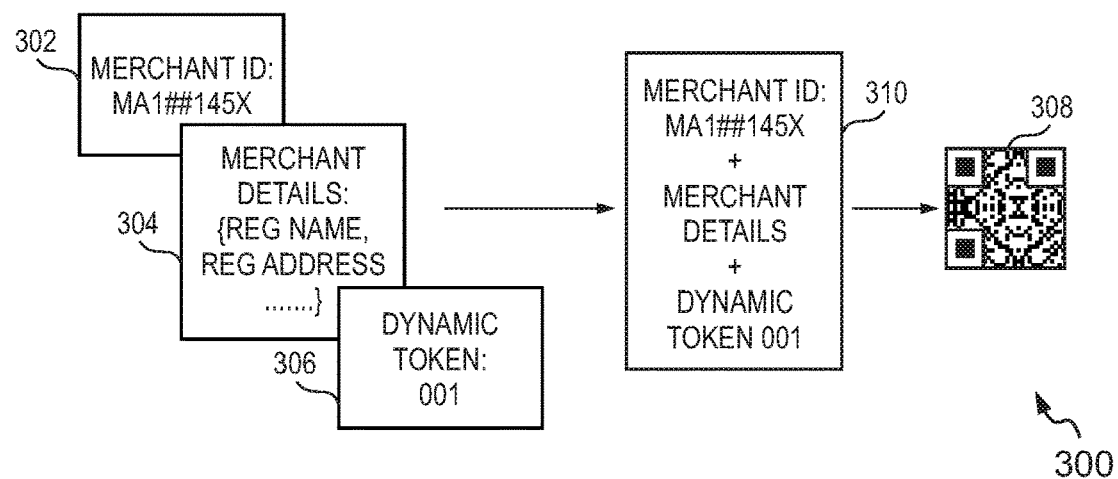
FIG. 3 illustrates an example representation of a machine-readable code generated for facilitating a payment transaction at the POS terminal and the information encrypted within the machine-readable code, in accordance with an example embodiment of the present disclosure.
FIG. 4 is an example representation of a table displaying merchant defined codes and corresponding nature of transaction, maintained at a merchant device, in accordance with an example embodiment of the present disclosure.

FIG. 3 illustrates an example representation 300 of a machine-readable code 308 generated for facilitating a payment transaction at the POS terminal 104 and the information encrypted within the machine-readable code, in accordance with an example embodiment of the present disclosure. The machine-readable code 308, is depicted as a QR code 308. As described earlier, the QR code 308 includes information corresponding to a merchant (such as a merchant ID and merchant details, etc.) and a dynamic token. In FIG. 3, merchant ID 302 is exemplarily depicted as 'MA1##145X'. Merchant details 304 may include merchant's registered name and address. The registered name and address may be expressed in texts and/or alphanumeric codes (not shown). The dynamic token 306 is "exemplarily depicted as '001'. The dynamic token is representative of the public key-private key pairing or the certificate that validates the public key-private key pairing managed by the payment server 118. A public key validated by the payment server 118 is provided to the POS terminal 104 and a private key validated by the payment server 118 is provided to the customer device 106 by means of the application facilitated at the device 106. The device 106 is linked to the application and hence is identified as registered customer device by the POS terminal 104 and/or the merchant device 112 based on the public key-private key relationship. Interaction between the public key and the private key validates the transaction at the POS terminal 104. The information corresponding to a merchant (such as a merchant ID and merchant details, etc.) and a dynamic token may be stored in a merchant database associated with the POS terminal 104 and the merchant device 112.

As shown by a box 310, all the three parts i.e. the merchant ID 302, the merchant details 304 and the dynamic token 306 are combined/bundled together to generate the QR code 308. The POS terminal 104 is configured with instructions such that the information encrypted within the QR code 308 are altered at pre-defined intervals (say every 5 minutes). At pre-defined interval, a QR code 308 with a new pattern i.e. different from a previous pattern, is generated. The new QR code includes the altered information. In one embodiment, only the dynamic token part is changed at pre-defined interval, resulting into change in the QR code 308.

FIG. 4 is an example representation of a table 400 displaying merchant defined codes and corresponding nature of transaction, maintained at the database associated with the merchant device 112, in accordance with an example embodiment. As seen in FIG. 4, the table 400 includes listings of nature/type of transactions in a first column 402 and merchant defined codes in a second column 404. Each nature of transaction in the column 402 is indicated by a merchant defined code in the column 404.

There may be various natures of transactions intended at the POS terminal 104. Some examples of transactions include 'authentication', 'purchase', 'void', 'refund', 'pay with cashback', among others. A merchant defined transaction code is assigned to each of the different natures of transaction. As an example, a transaction type 'authentication' can be indicated by a transaction code '11', a transaction type 'purchase' can be indicated by a transaction code '12', a transaction type 'void' can be indicated by a transaction code '14' and so on.

The merchant defined transaction codes are known to agents (such as the agent 108). Based on the nature of transaction (authentication, purchase, refund, etc.) intended at the POS terminal 104, the agent 108 can enter a valid transaction code at the merchant device 112. Provision of the transaction code at the merchant device 112, completes the transaction at the POS terminal 104 and passes a transaction request to the issuer server 114 via the payment network 120 based on requirement. It shall be understood that, the transaction code may also be provided at the POS terminal 104. The table 400 shown in FIG. 4 is exemplary and for the purposes of explanation. In practical, the database associated with the merchant device 112 may include multiple such tables listing varying transaction codes for different natures of transaction and each table may have fewer or more columns and rows than depicted in FIG. 4.

FIGS. 5-9 represent flow sequence diagrams illustrating various natures/types of transactions being performed at the POS terminal 104, as described with reference to FIG. 4. Each nature/type of transaction is explained in detail with reference to corresponding FIGS.

Figure 5:
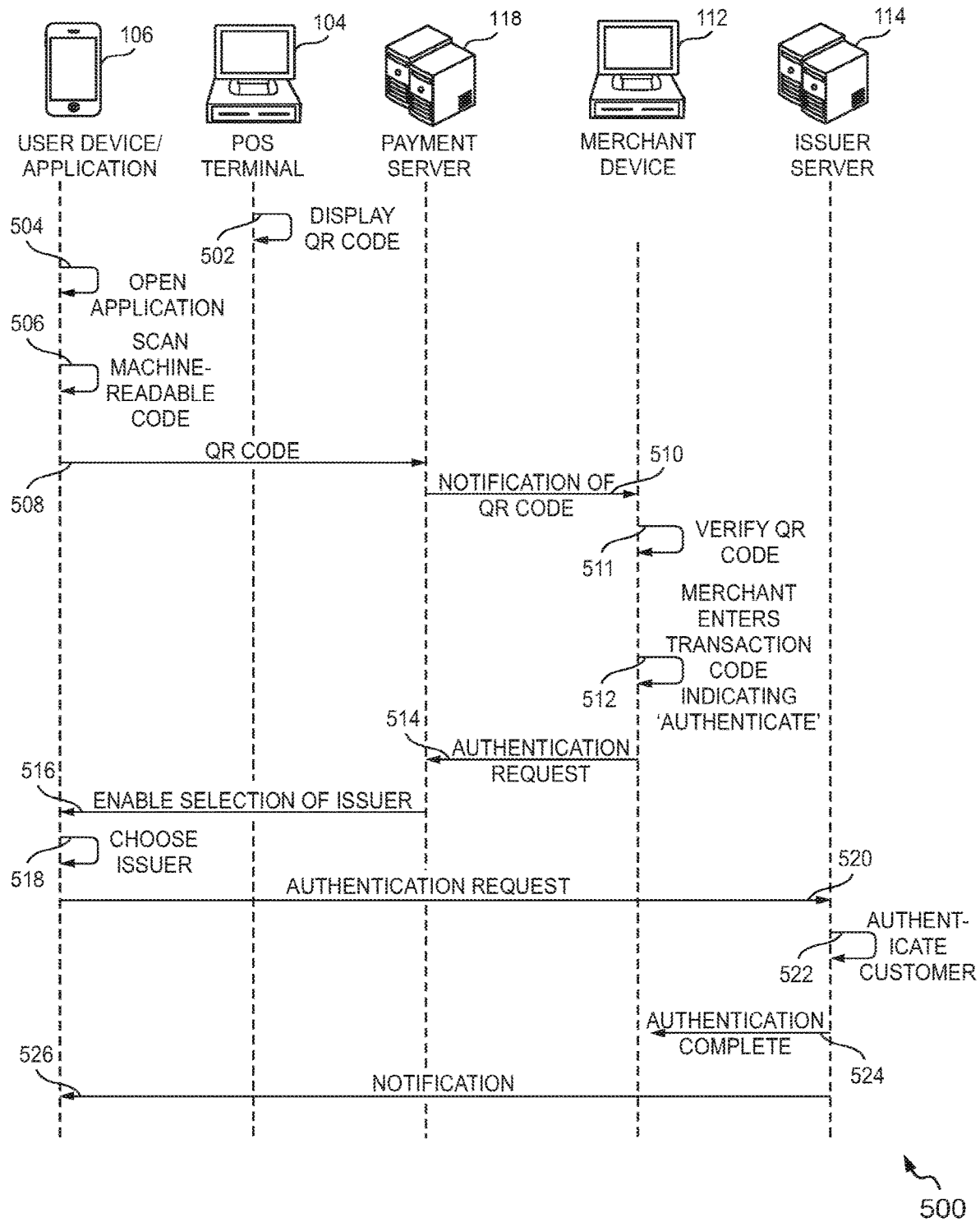
FIG. 5 represents a sequence flow diagram representing a method of facilitating an authentication transaction at the POS terminal, in accordance with an example embodiment of the present disclosure.

FIG. 5 represents a sequence flow diagram 500 representing a method of facilitating an authentication transaction at a POS terminal, in accordance with an example embodiment. It is assumed that the customer 102 (present before the POS terminal 104) has a payment application present at his device 106 and the payment application is already authenticated by the issuer server 114 or the payment server 116. Alternatively, such installation of the application and authentication can also be performed at the merchant facility 101 when the customer 102 wishes to use the application for the payment purposes in the device 106 for the first time.

At 502, the POS terminal 104 displays a machine-readable code. The machine-readable code is a QR code, in an example. At 504, the customer 102 opens the application in the device 106.

At 506, the customer 102 scans the machine-readable code. At this instant, the POS terminal 104 verifies whether the customer device 106 scanning the machine-readable code is linked to the POS terminal 104 on basis of a validated pair of encryption keys. In other words, the POS terminal 104 identifies the customer device 106 as a validated device based on a public key-private key partnership between the POS terminal 104 and the customer device 106.

At 508, the application installed in the device 106 sends the scanned machine-readable code to the payment server 118. It shall be noted that the payment server 118 accesses the application to fetch the information encrypted within the machine-readable code. At 510, the payment server 118 sends a notification associated with the machine-readable code to the merchant device 112. In an embodiment, the notification includes the machine-readable code received from the customer device 106. For instance, the payment server 118 sends the same machine-readable code to the merchant device 112 that is received from the customer device 106. It shall be noted that, the machine-readable code may also be sent to the POS terminal 104 by the payment server 118. At 511, the merchant device 112 verifies that the QR code received by the merchant device 112 is same as the QR code that is captured by the customer device 106.

Once the QR code is verified (i.e. matches) at 512, the merchant device 112 receives a merchant defined transaction code indicating 'authenticate' transaction for authentication of the customer 102. The transaction code can normally be entered by the agent 108. For instance, the agent 108 identifies the nature of the transaction as 'authenticate' transaction and hence enters the corresponding merchant defined transaction code (e.g. '11') at the merchant device 112. It shall be noted that, the provision of the merchant defined transaction codes are not limited to just the merchant device 112. The merchant defined transaction codes may also be provided at the POS terminal 104 by the agent 108.

At 514, the merchant device 112 (or the POS terminal 104) sends an authentication request to the payment server 118. It shall be noted that the authentication request may be sent to the payment server 118 via the acquirer server 116. The operations performed by the acquirer server 116 are not described herein for the sake of brevity.

At 516, the payment server 118 enables an option in the application that allows selection of an issuer managing the issuer server 114 and associated with an issuer account of the customer 102. At 518, the customer 102 chooses the respective issuer. The payment server 118 receives the selection made by the customer 102 in the application.

At 520, the payment server 118 sends the authentication request to the issuer server 114. At 522, the issuer server 114 authenticates the customer 102. The issuer server 114 may authenticate the customer 102 as a registered customer based on verification of customer credentials that has been registered with the issuer server 114. Further, the issuer server 114 identifies the customer 102 as a registered customer based on a registered contact number of the device 106 associated with the customer 102. Further, the customer credentials registered with the issuer server 114 and the customer credentials registered with the application may be checked to determine if they match and are associated with the customer 102.

At 524, the authentication is completed. If the customer 102 is not identified as a registered customer, the authentication fails and the transaction may be declined.

At 526, a notification concerning completion of authentication is sent to the customer 102.

Figure 6A:
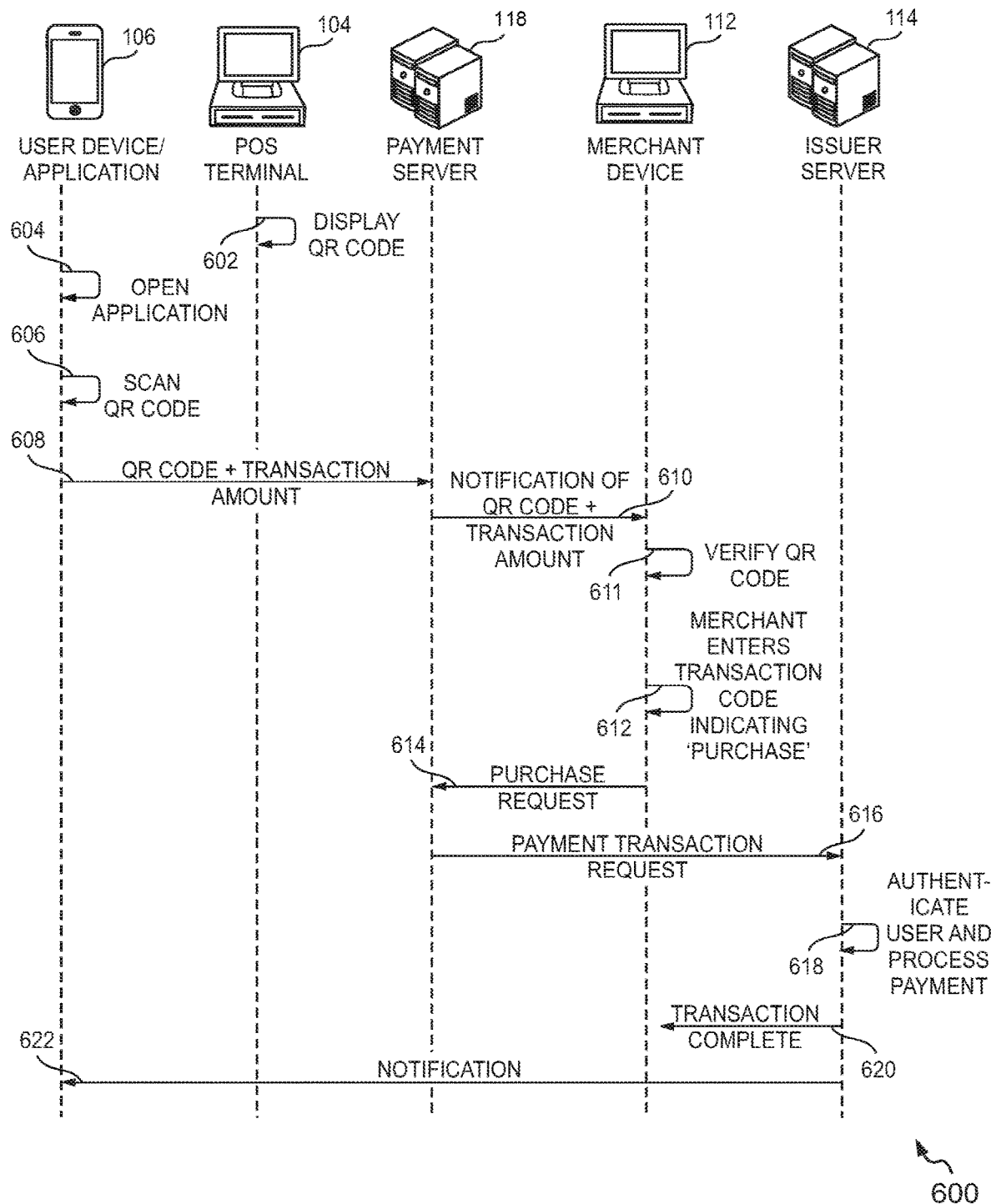
FIGS. 6A and 6B represent sequence flow diagrams representing methods of facilitating a purchase transaction at the POS terminal, in accordance with some example embodiments of the present disclosure.

FIG. 6A represents a sequence flow diagram 600 representing a method of facilitating a purchase transaction at a POS terminal, in accordance with an example embodiment. The customer 102, present before the POS terminal 104, may initiate a purchase transaction using the device 106.

The sequence flow diagram 600 starts at 602, where the POS terminal 104 displays the machine-readable code (e.g. a QR code). This machine-readable code may be different from the machine-readable code displayed at operation 502. However, if the predefined duration (e.g., 5 minutes) since the last machine-readable code was displayed at operation 502 has not lapsed, the machine-readable code displayed at operation 502 and the machine-readable code displayed at operation 602 may be the same.

At 604, the customer 102 opens the application in the device 106. The application may be associated with a default payment card of the customer, and the application can be managed by the payment server 116 or optionally by the issuer server 114 associated with the default payment card. At 606, the customer 102 scans the machine-readable code (e.g., the QR code). At this instant, the customer 102 may enter a transaction amount associated with the purchase in a field presented at the interface 202 of the application. The POS terminal 104 verifies whether the customer device 106 scanning the machine-readable code is linked to the POS terminal 104 on the basis of a validated pair of encryption keys. In other words, the POS terminal 104 identifies the customer device 106 as a validated device based on a public key-private key partnership between the POS terminal 104 and the customer device 106.

At 608, the application installed in the device 106 sends the scanned machine-readable code and the transaction amount to the payment server 118. It shall be noted that the device 106 can fetch the information encrypted within the machine-readable code if a valid public key-private key relationship exists between the POS terminal 104 and the customer device 106. The machine-readable code includes a merchant ID, merchant details and a dynamic token.

At 610, the payment server 118 sends a notification associated with the machine-readable code and the transaction amount to the merchant device 112. In an embodiment, the notification includes the machine-readable code and the transaction amount that was received from the customer device 106. However, in alternate embodiments, the notification may include other representations of the machine-readable code and the transaction amount, or merely an acknowledgement that the payment server 118 received the machine-readable code from the customer device 106. It shall be noted that the payment server 118 can also send the machine-readable code and the transaction amount to the POS terminal 104. Also, the POS terminal 104 and the merchant device 112 can be a single device. At 611, the merchant device 112 verifies that the QR code received by the merchant device 112 is same as the QR code that is captured by the customer device 106.

The agent identifies the nature of the transaction as 'purchase' and hence enters the corresponding merchant defined transaction code (e.g. '12') at the merchant device 112. At 612, the merchant device 112 receives the merchant defined transaction code indicating 'purchase' for completion of the transaction. The merchant defined transaction code indicating 'purchase' can also be entered at the POS terminal 104 by the agent 108.

At 614, the merchant device 112 sends a purchase request to the payment server 118. The purchase request may include a transaction ID and the transaction amount as an example. It shall be noted that the purchase request may be received by the payment server 118 via the acquirer server 116. The operations performed by the acquirer server 116 are not described herein for the sake of brevity.

In a non-limiting example, at 616, the payment server 118 sends a payment transaction request to the issuer server 114, and the issuer server 114 authenticates user and processes the payment. It is noted that there may be multiple to and fro communication between the payment server 116, the acquirer server (e.g., the acquirer server 116), the issuer server 114 and the application present in the customer device 106 to effect the transaction from an issuer account to a merchant acquirer account, and these are not provided herein for the sake of brevity. The processing of payment transaction may involve authentication of the user as shown in operation 618. For instance, the issuer server 114 authenticates the customer 102 at 618 and processes the payment. The customer may be authenticated based on authentication information or customer credentials registered with the issuer server 114.

At 620, the transaction is completed. The issuer server 114 notifies the customer 102 on transaction completion through a text message, an email or in the online banking portal at 622. The POS terminal 104 also receives (not shown) the notification of the successful transaction from its acquirer server such as the acquirer server 116.

Figure 6B:
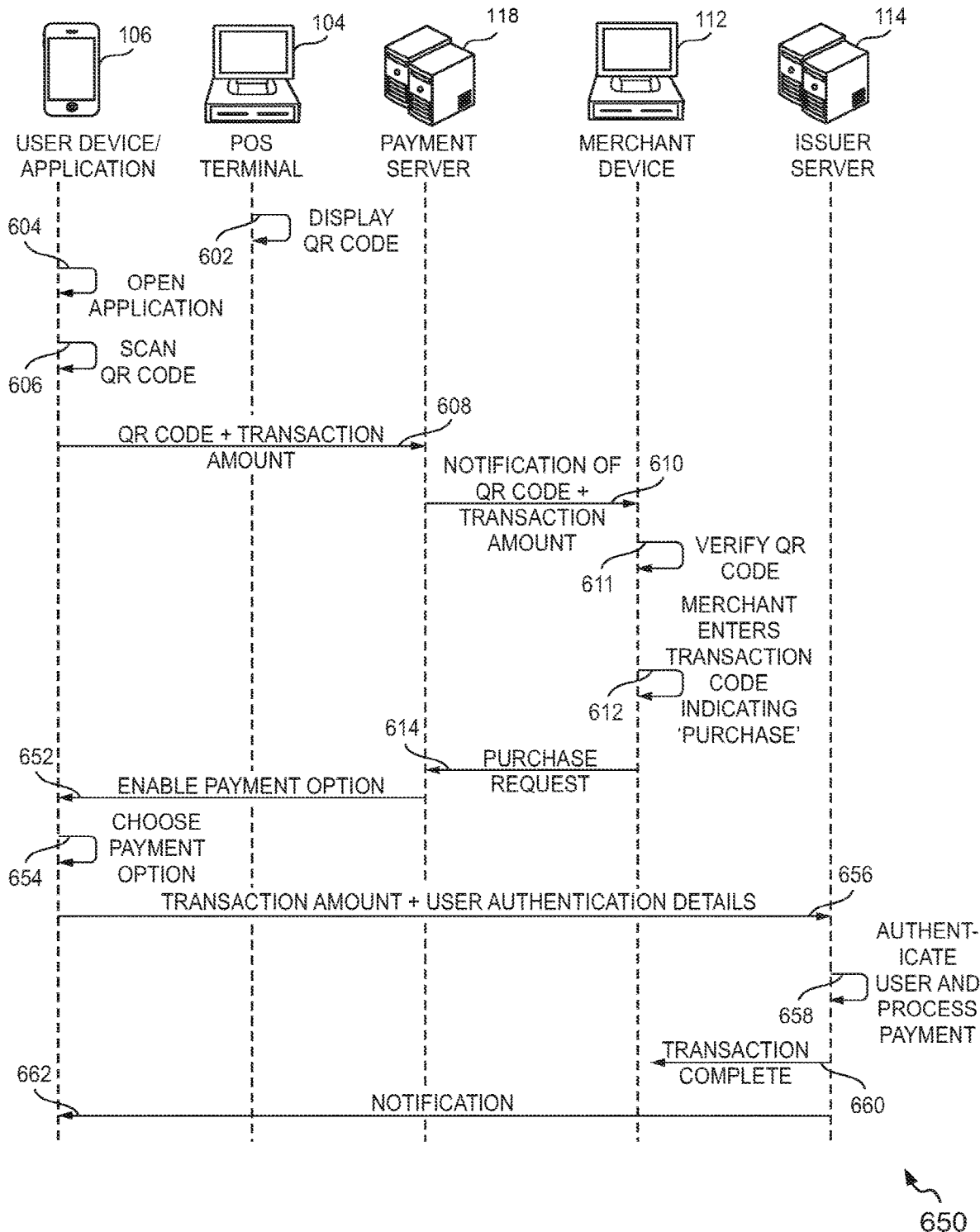

FIG. 6B represents a sequence flow diagram 650 representing a method of facilitating a purchase transaction at a POS terminal, in accordance with an example embodiment. The customer 102, present before the POS terminal 104, may initiate a purchase transaction using the device 106.

The sequence flow diagram 650 starts at 602, where the POS terminal 104 displays the machine-readable code (e.g. a QR code). This machine-readable code may be different from the machine-readable code displayed at operation 502. However, if the predefined interval (e.g., 5 minutes) since the last machine-readable code was displayed at operation 502 has not lapsed, the machine-readable code displayed at operation 502 and the machine-readable code displayed at operation 602 may be the same.

At 604, the customer 102 opens the application in the device 106. In this example embodiment, the application may be managed by the payment server 116, and may be associated with or include details of various payment options of the customer 102. For instance, the customer may have linked three payment cards with the application. At 606, the customer 102 scans the machine-readable code (e.g., the QR code). At this instant, the customer 102 may enter a transaction amount associated with the purchase in a field presented at the interface 202 of the application. The POS terminal 104 verifies whether the customer device 106 scanning the machine-readable code is linked to the POS terminal 104 on the basis of a validated pair of encryption keys. In other words, the POS terminal 104 identifies the customer device 106 as a validated device based on a public key-private key partnership between the POS terminal 104 and the customer device 106.

At 608, the application installed in the device 106 sends the scanned machine-readable code and the transaction amount to the payment server 118. It shall be noted that the device 106 can fetch the information encrypted within the machine-readable code if a valid public key-private key relationship exists between the POS terminal 104 and the customer device 106. The machine-readable code includes a merchant ID, merchant details and a dynamic token.

At 610, the payment server 118 sends a notification associated with the machine-readable code and the transaction amount to the merchant device 112. Without limiting the scope of present disclosure, the notification includes the machine-readable code and the transaction amount. It shall be noted that the payment server 118 can also send the machine-readable code and the transaction amount to the POS terminal 104. Also, the merchant device 112 and the POS terminal 104 may be a single device. At 611, the merchant device 112 verifies that the QR code received by the merchant device 112 is same as the QR code that is captured by the customer device 106.

The agent identifies the nature of the transaction as 'purchase' and hence enters the corresponding merchant defined transaction code (e.g. '12') at the merchant device 112. At 612, the merchant device 112 receives the merchant defined transaction code indicating 'purchase' for completion of the transaction. The merchant defined transaction code indicating 'purchase' can also be entered at the POS terminal 104 by the agent 108.

At 614, the merchant device 112 sends a purchase request to the payment server 118. The purchase request may include a transaction ID and the transaction amount as an example. It shall be noted that the purchase request may be received by the payment server 118 via the acquirer server 116. The operations performed by the acquirer server 116 are not described herein for the sake of brevity.

At 652, the payment server 118 enables or invokes a payment option in the application in the customer device 106. It shall be noted that enabling a payment option may refer to enabling selection of a mode of payment for the purchase. The various modes of payment displayed in the application selectable by the customer 102 may include digital wallet payment, credit/debit card payment, internet banking payment, cash payment, loyalty points payment, etc.

At 654, the payment server 118 receives a payment option selected by the customer 102 in the application. It shall be noted that, selection of cash payment mode completes the transaction at the operation 618. However, selection of all other payment modes either opens new application interfaces in the customer device 106.

Selection of digital wallet payment mode may open a new application interface associated with a digital wallet application enabling signing in of the customer 102 to a digital wallet of the customer 102. The digital wallet may be debited following the sign in by the customer 102. In case of selection of a particular payment card of the customer, the application redirects to an interface associated with issuer sever of the particular payment card selected by the customer 102. In case of selection of internet banking payment mode, the application allows the customer 102 to select the issuer bank associated with the issuer account of the customer 102. Thereafter, an online banking portal of the issuer bank opens in the device 106 where the customer 102 enters his/her authentication information or the customer credentials. Assuming that the customer 102 has selected a payment card or mobile or internet banking payment mode, the sequence flow diagram 650 now moves to operation 656.

At 656, the transaction amount and user authentication information are received by the issuer server 114 from the customer device 106. Herein, the issuer server 114 should be understood as an issuer server associated with the selected payment card of the customer or selected bank account of the customer. In another example, the issuer server 114 may also be an example of a wallet server if a digital wallet application is selected by the user (within the application in the customer device 106) for completing the purchase transaction. It shall be understood that the transaction amount and user authentication information are received by the issuer server 114 via the payment server 118.

The issuer server 114 authenticates the customer 102 at 658. The customer is authenticated based on authentication information or customer credentials registered with the issuer server 114. At 660, the transaction is completed. The issuer server 114 notifies the customer 102 on transaction completion through a text message, an email or in the online banking portal. Further, the customer 102 receives notification in the application as shown by operation 662. Also, the POS terminal 104 receives (not shown) the notification of the successful transaction from its acquirer server such as the acquirer server 116.

In some cases, the payment application present in the customer device 106 is exclusively linked with one payment card of the customer associated with the issuer server 114. In such cases, the once the operations 612 and 614 are performed, the issuer account associated with the issuer server 114 is debited and transaction is completed by crediting the debit amount into the acquire account of the merchant via the payment server 116. Hence, in such cases, the operations 616 to 622 are not needed.

Figure 7:
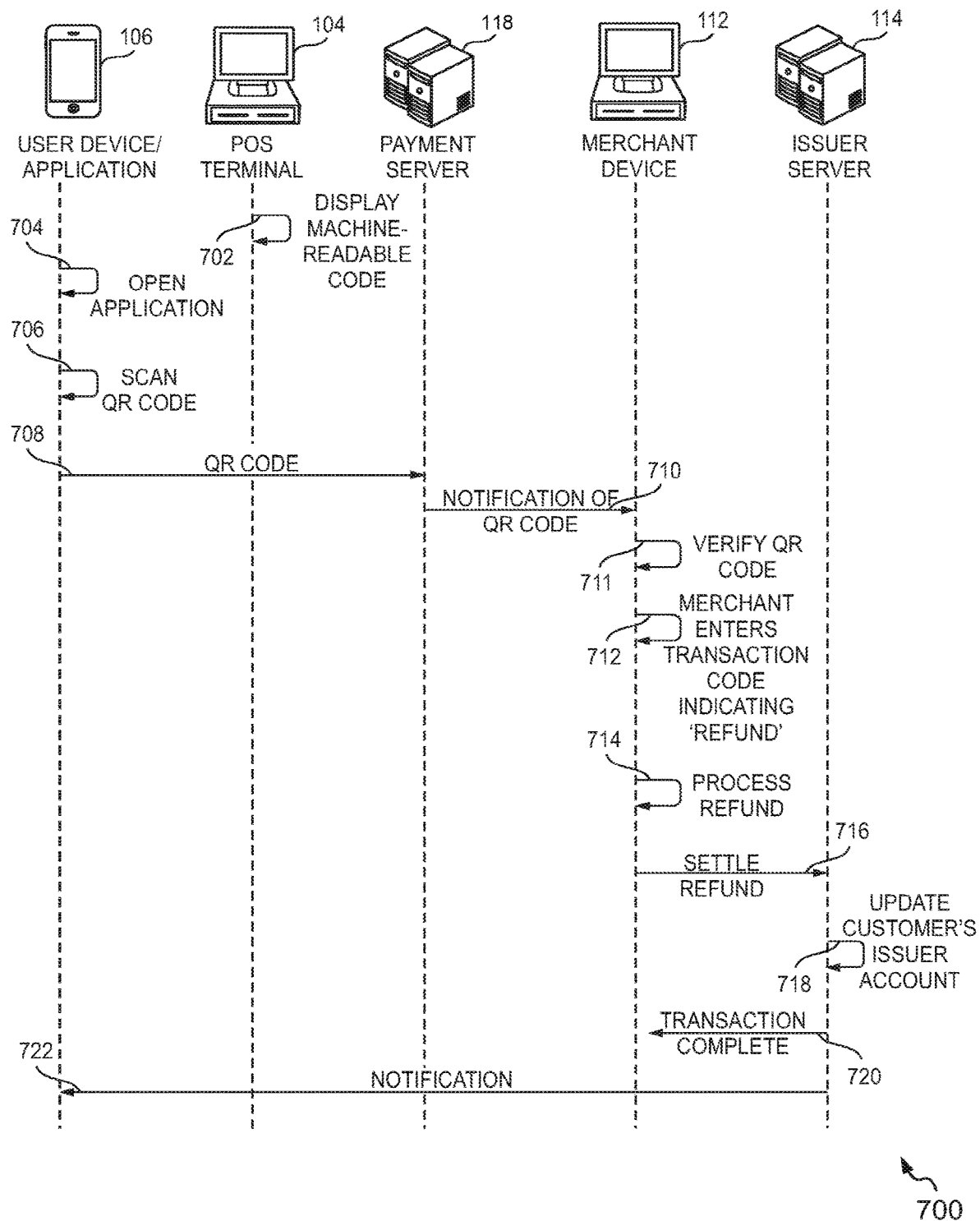
FIG. 7 represents a sequence flow diagram representing a method of facilitating a refund transaction at the POS terminal, in accordance with an example embodiment of the present disclosure.

FIG. 7 represents a sequence flow diagram 700 representing a method of facilitating a refund transaction at a POS terminal, in accordance with an example embodiment. The customer 102 standing at the POS terminal 104 operating the device 106 may have performed a purchase transaction by entering a transaction amount in the interface 202 which is greater than the actual transaction amount for the purchase. Alternatively, the customer 102 may want to return a product already purchased from the merchant. Thereafter, a refund is being processed at the merchant device 112 or the POS terminal 104.

At 702, the POS terminal 104 displays the machine-readable code. This machine-readable code may be different from the machine-readable code displayed at operation 602 or operation 502. However, if the pre-defined interval since the last machine-readable code was displayed at operations 602 or 502 has not lapsed, the machine-readable code displayed at operations 602, 502 and the machine-readable code displayed at operation 702 may be the same.

At 704, the customer 102 opens the application in the device 106. At 706, the customer 102 scans the machine-readable code. The POS terminal 104 verifies whether the customer device 106 scanning the machine-readable code is linked to the POS terminal 104 on basis of a validated pair of encryption keys. In other words, the POS terminal 104 identifies the customer device 106 as a validated device based on a public key-private key partnership between the POS terminal 104 and the customer device 106.

At 708, the application installed in the device 106 sends the scanned machine-readable code to the payment server 118. It shall be noted that the customer device 106 can fetch the information encrypted within the machine-readable code if a valid public key-private key relationship exists between the POS terminal 104 and the customer device 106. The machine-readable code includes a merchant ID, merchant details and a dynamic token.

At 710, the payment server 118 sends the notification associated with the machine-readable code to the merchant device 112 (or the POS terminal 104). The agent identifies the nature of the transaction as 'refund' and hence enters the corresponding merchant defined transaction code (e.g. '21') at the merchant device 112 (or the POS terminal 104).

At 711, the merchant device 112 verifies that the QR code received by the merchant device 112 is same as the QR code that is captured by the customer device 106. At 712, the merchant device 112 receives a merchant defined transaction code indicating 'refund' for completion of the transaction.

At 714, the merchant device 112 processes the refund. It shall be noted that the merchant device 112 identifies the original mode of payment as described earlier. If the original mode of payment was interne banking, then at 716, the merchant device 112 may communicate with the issuer server 114 via the acquirer server 116 and payment network 120 requesting settlement of funds between the merchant account and the issuer account of the customer 102. It shall be noted that if the original mode of payment was digital wallet payment, the acquirer server 116 updates the refund in the digital wallet of the customer 102.

At 718, the issuer server updates the customer's issuer account with the refund amount.

At 720, the transaction is completed and a notification is sent to the customer 102 at 722.

Figure 8:
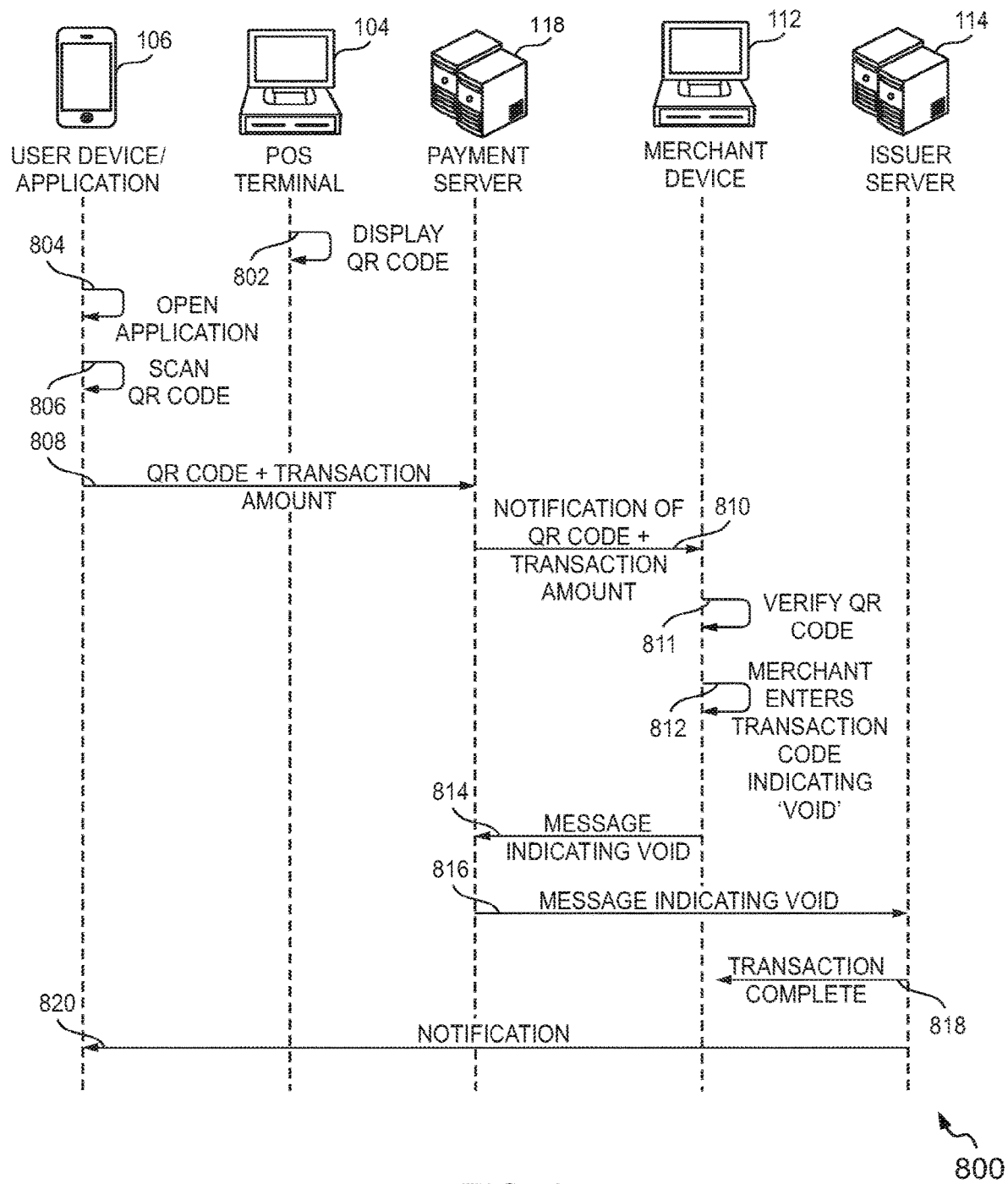
FIG. 8 represents a sequence flow diagram representing a method of facilitating a void transaction at the POS terminal, in accordance with an example embodiment of the present disclosure.

FIG. 8 represents a sequence flow diagram 800 representing a method of facilitating a void transaction at a POS terminal, in accordance with an example embodiment. The customer 102 standing at the POS terminal 104 operating the device 106 may desire to cancel a purchase transaction subject to various reasons. In such instances, the customer 102 may initiate a void transaction.

The sequence flow diagram 800 starts at 802, where the POS terminal 104 displays the machine-readable code. It shall be noted that a void transaction may follow immediately after a purchase transaction. Hence, the machine-readable code displayed at 802 may be the same as the machine-readable code displayed at operation 602. However, if the pre-defined interval since the last machine-readable code was displayed at operation 602 has lapsed, the machine-readable code displayed at operation 802 and the machine-readable code displayed at operation 602 may be different.

At 804, the customer 102 opens the application in the device 106. At 806, the customer 102 scans the machine-readable code. The POS terminal 104 verifies whether the customer device 106 scanning the machine-readable code is linked to the POS terminal 104 on basis of a validated pair of encryption keys. In other words, the POS terminal 104 identifies the customer device 106 as a validated device based on a public key-private key partnership between the POS terminal 104 and the customer device 106.

At 808, the application installed in the device 106 sends the scanned machine-readable code to the payment server 118. It shall be noted that the customer device 106 can fetch the information encrypted within the machine-readable code if a valid public key-private key relationship exists between the POS terminal 104 and the customer device 106. The machine-readable code includes a merchant ID, merchant details and a dynamic token.

At 810, the payment server 118 sends the notification associated with the machine-readable code to the merchant device 112. It shall be noted that the payment server 118 may also send the machine-readable code and the transaction amount to the POS terminal 104. At 811, the merchant device 112 verifies that the QR code received by the merchant device 112 is same as the QR code that is captured by the customer device 106.

The agent 108 identifies the nature of the transaction as 'void' and hence enters the corresponding merchant defined transaction code (e.g. '14') at the merchant device 112. At 812, the merchant device 112 receives the merchant defined transaction code indicating 'void' for completion of the transaction.

At 814, the merchant device 112 sends a message indicating a void transaction to the payment server 118. The message indicating the void transaction may include a transaction ID as an example. It shall be noted that the message indicating the void transaction may be received by the payment server 118 via the acquirer server 116.

At 816, the message indicating the void transaction is received by the issuer server 114 from the payment server 118. The payment server 118 has information on the issuer server 114 based on the customer's selection of the issuer in the application as described earlier. At this instant, the issuer server 114 ensures that no fund is released to the merchant account/acquirer account of the merchant for the purchase transaction attempted as depicted by the sequence flow diagram 600.

At 818, the transaction is completed, and at 820, the issuer server 114 notifies the customer 102 on transaction completion through a text message, an email or in the online banking portal. Further, the customer 102 receives notification in the application.

In another example embodiment, a void transaction may be processed and settled at the merchant device 112 and the acquirer server 116 without the message indicating void transaction being sent to the issuer server 114 via the payment server 118. Hence, the sequence flow diagram 800, may end at operation 812.

Figure 9:
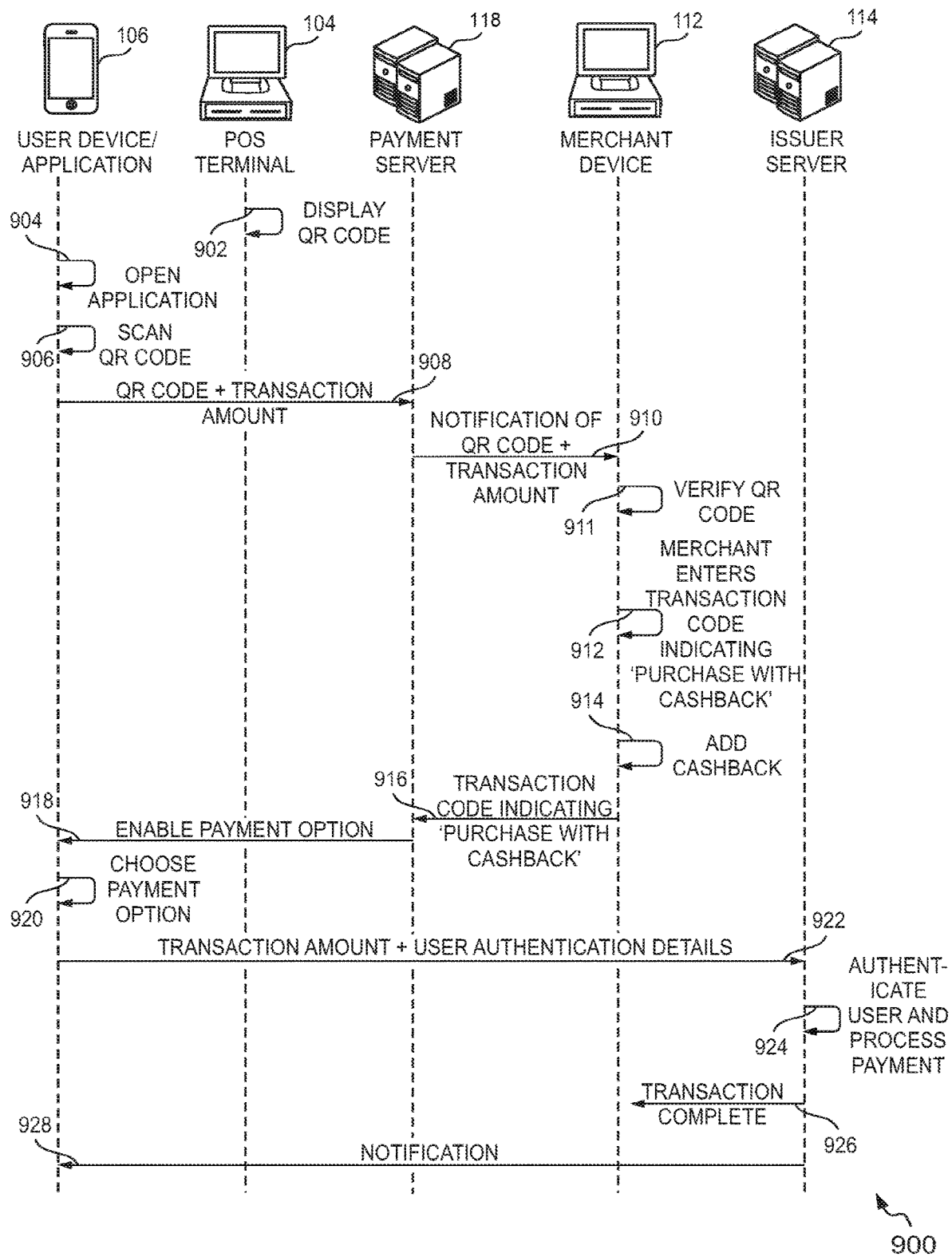
FIG. 9 represents a sequence flow diagram representing a method of facilitating a purchase with cashback transaction at the POS terminal, in accordance with an example embodiment of the present disclosure.

FIG. 9 represents a sequence flow diagram 900 representing a method of facilitating a purchase with cashback transaction at a POS terminal, in accordance with an example embodiment. The customer 102 standing at the POS terminal 104 operating the device 106 may initiate a purchase transaction. The agent 108 may inform the customer 102 about cashback rewards offered by the merchant on particular mode of payment. The customer 102 may be willing to receive cashback reward offered by the merchant and hence selects the payment mode with which the cashback reward is associated. It is assumed that cashback is offered on internet banking transactions. The sequence flow diagram 900 starts at 902.

At 902, the POS terminal 104 displays the machine-readable code. As understood, this machine-readable code may be same of different from all of the machine-readable codes displayed at operations 502, 602, 702 and 802.

At 904, the customer 102 opens the application in the device 106. At 906, the customer 102 scans the machine-readable code. At this instant, the customer 102 may enter a transaction amount associated with the purchase in a field presented at the interface 202 of the application. The POS terminal 104 verifies whether the customer device 106 scanning the machine-readable code is linked to the POS terminal 104 on basis of a validated pair of encryption keys. In other words, the POS terminal 104 identifies the customer device 106 as a validated device based on a public key-private key partnership between the POS terminal 104 and the customer device 106.

At 908, the application installed in the device 106 sends the scanned machine-readable code and the transaction amount to the payment server 118.

At 910, the payment server 118 sends the notification associated with the machine-readable code and the transaction amount to the merchant device 112. It shall be noted that the payment server 118 can also send the machine-readable code and the transaction amount to the POS terminal 104. At 911, the merchant device 112 verifies that the QR code received by the merchant device 112 is same as the QR code that is captured by the customer device 106.

The agent identifies the nature of the transaction as 'purchase with cashback' and hence enters the corresponding merchant defined transaction code (e.g. '25') at the merchant device 112. At 912, the merchant device 112 receives the merchant defined transaction code indicating 'purchase with cashback' for completion of the transaction.

At 914, the merchant device 112 adds cashback amount in the transaction. It shall be noted that, at this instant, the merchant device 112 may only add a cashback code for the transaction. As an example, the cashback code may be appended to the purchase request to be sent to the payment server 118. The actual cashback amount shall be reflected later in the customer's issuer account.

At 916, the merchant device 112 sends the purchase request to the payment server 118. The purchase request may include a transaction ID, the cashback code and the transaction amount as an example. It shall be noted that the purchase request may be received by the payment server 118 via the acquirer server 116.

At 918, the payment server 118 enables a payment option in the application. It shall be noted that enabling a payment option may refer to enabling selection of a mode of payment for the purchase. The various modes of payment displayed in the application selectable by the customer 102 may include digital wallet payment, credit/debit card payment, internet banking payment, cash payment, loyalty points payment, etc.

At 920, the payment server 118 receives a payment option selected by the customer 102 in the application. Assuming that the customer 102 has selected an internet banking payment mode, the customer 102 will be redirected to an online banking portal of the issuer bank. The customer 102 enters his/her authentication information or the customer credentials. The sequence flow diagram 900 now moves to operation 922.

At 922, the transaction amount and user authentication information are received by the issuer server 114 from the customer device 106 via the payment network 120.

The issuer server 114 authenticates the customer 102 at 924. The customer 102 is authenticated based on authentication information or customer credentials registered with the issuer server 114.

At 926, the transaction is completed. At 928, the issuer server 114 notifies the customer 102 on transaction completion through a text message, an email or in the online banking portal. Further, the customer 102 receives notification in the application. Upon completion of the transaction, the cashback reward may be added in the issuer account of the customer 102. It shall be noted that the cashback reward may be associated with one or more payment modes and not limited to internet banking.

Figure 10:
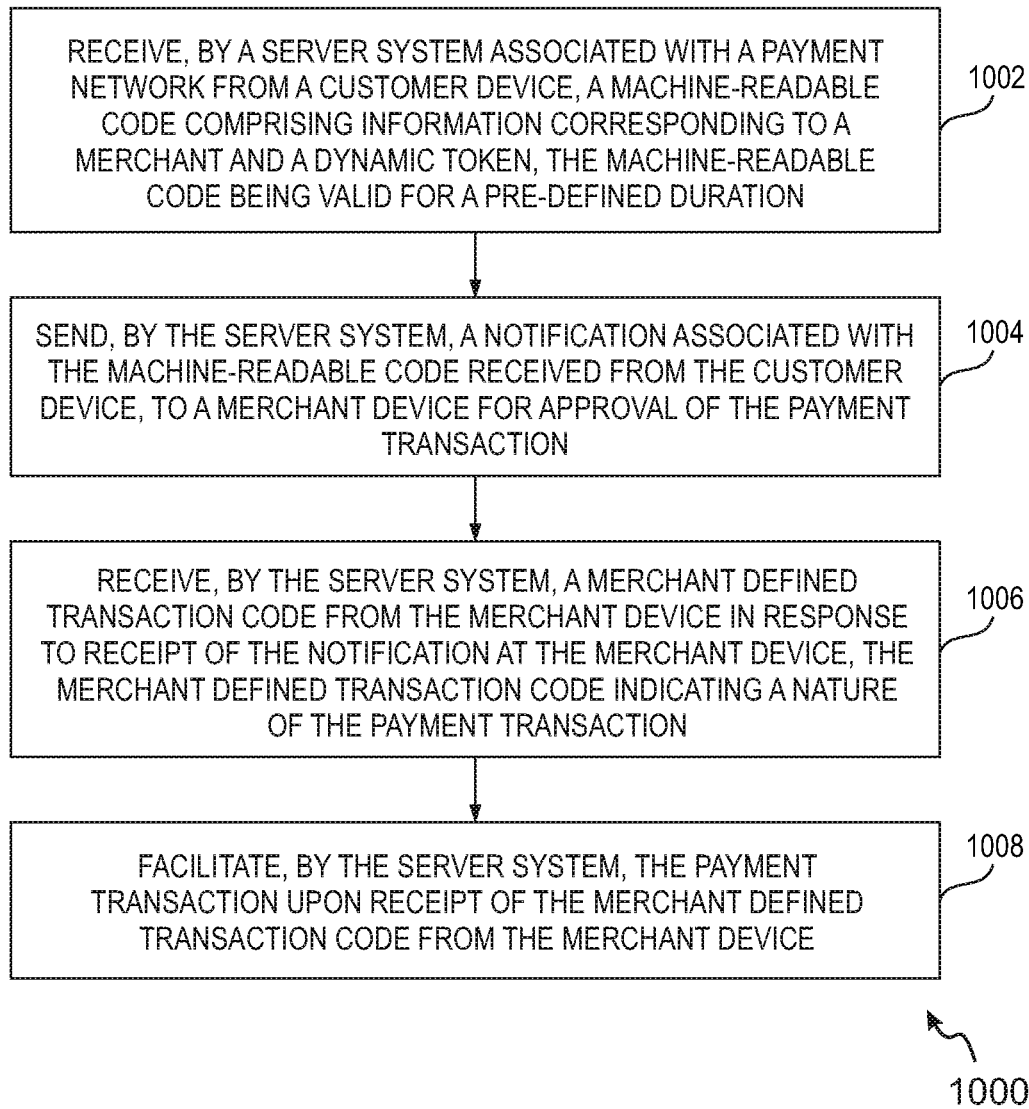
FIG. 10 illustrates a flow diagram of a method for facilitating a payment transaction at the POS terminal, in accordance with one embodiment of the present disclosure.

FIG. 10 illustrates a flow diagram of a method 1000 for facilitating a payment transaction at a POS terminal, in accordance with one embodiment of the present disclosure. The method 1000 depicted in the flow diagram may be executed by, for example, the payment server 118. Operations of the flow diagram 1000, and combinations of operation in the flow diagram 1000, may be implemented by, for example, hardware, firmware, a processor, circuitry and/or a different device associated with the execution of software that includes one or more computer program instructions. The operations of the method 1000 are described herein with help of the payment server 118. It is noted that the operations of the method 1000 can be described and/or practiced by using a system other than the payment server 118. The method 1000 starts at operation 1002.

At 1002, the payment server 118 receives the machine-readable code including encrypted information corresponding to a merchant and a dynamic token. The machine-readable code is a dynamic code and changes after every pre-determined duration. Accordingly, the machine-readable code remains valid for only a pre-defined interval. It shall be noted that the information corresponding to the merchant includes a merchant ID and merchant details, such as, registered name and address of the merchant. The dynamic token as described above is representative of a certificate or a public key-private key pair, which indicates that the POS terminal 104 identifies the customer device 102 and can support validated transactions. The dynamic token changes at pre-defined intervals thereby causing the machine-readable code to change at pre-defined intervals.

At 1004, the payment server 118 sends a notification associated with the machine-readable code to the merchant device 112 for approval of the payment transaction. In an example, the notification includes the machine-readable code that was received from the customer device 106. The merchant device 112 thereafter verifies the machine-readable code received in the notification by matching it against the machine-readable code scanned by the customer device 106. As described earlier, the POS terminal 104 can be the merchant device 112 in some embodiments.

At 1006, the payment server 118 receives a merchant defined transaction code from the merchant device. The merchant defined transaction code can be provided by the agent 108. The merchant defined transaction code indicates the nature of the transaction. There may be various natures of transactions intended at the POS terminal 104. Some examples of transactions include 'authentication', 'purchase', 'void', 'refund', 'pay with cashback', among others. A merchant defined transaction code is assigned to each of the different natures of transaction. As an example, a transaction type 'authentication' can be defined by a transaction code '11', a transaction type 'purchase' can be defined by a transaction code '12', a transaction type 'void' can be defined by a transaction code '14' and so on.

At 1008, the method 1000 includes facilitating, by the server system, the payment transaction upon receipt of the merchant defined transaction code from the merchant device. For instance, as the merchant device 112 (or POS terminal 104) provides the transaction code for "purchase", the payment transaction is initiated from the issuer account associated with the customer 102 to an acquirer account associated with the merchant.

Figure 11:
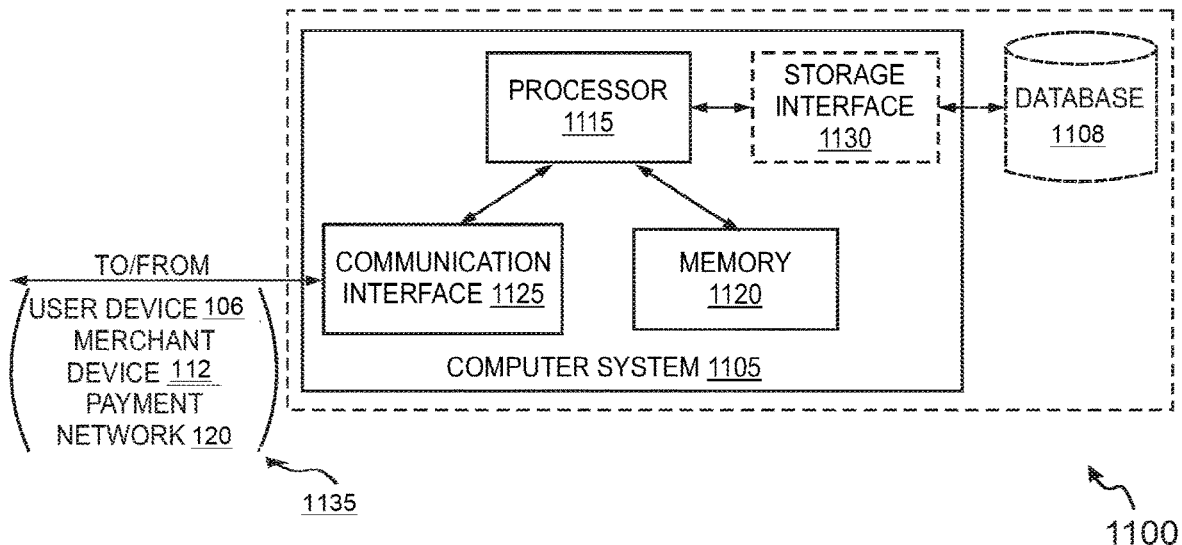
FIG. 11 is a simplified block diagram of the server system used for facilitating a payment transaction at the POS terminal, in accordance with one embodiment of the present disclosure.

FIG. 11 is a simplified block diagram of a server system 1100 used for facilitating a payment transaction at a POS terminal, in accordance with one embodiment of the present disclosure. Examples of the server system 1100 include, but are not limited to, the acquirer server 116, the payment server 118 and the issuer server 114 illustrated in FIG. 2. The server system 1100 includes a computer system 1105 and a database 1108.

The computer system 1105 includes at least one processor 1115 for executing instructions. Instructions may be stored in, for example, but not limited to, a memory 1120. The processor 1115 may include one or more processing units (e.g., in a multi-core configuration).

The processor 1115 is operatively coupled to a communication interface 1125 such that computer system 1105 is capable of communicating with a remote device 1135 (such as the merchant device 112, the POS terminal 104 and/or the customer device 106) or communicating with any entity within the payment network 120. For example, the communication interface 1125 may receive the payment transaction request, where the payment transaction request is generated in response to purchase of products by a customer and scanning of the products at a checkout counter by an agent.

The processor 1115 may also be operatively coupled to the database 1108. The database 1108 is any computer-operated hardware suitable for storing and/or retrieving data, such as, but not limited to, transaction data generated as part of sales activities conducted over the bankcard network including data relating to merchants, account holders or customers, and purchases. The database 1108 may also store information related to a plurality of user's issuer accounts. Each issuer account data includes at least one of a cardholder name, a cardholder address, an account number, MPIN, and other account identifier. The database 1108 may also store information of a plurality of merchants. The database 1108 may also store information associated with a regulatory body of issuers and regulations defined the regulatory body for carrying out payment transactions. The regulations may include rules of verifying/authenticating a user/card holder (such as the customer 102) initiating a payment transaction. The database 1108 may also include instructions for settling transactions including merchant bank account information. The database 1108 may include multiple storage units such as hard disks and/or solid-state disks in a redundant array of inexpensive disks (RAID) configuration. The database 1108 may include a storage area network (SAN) and/or a network attached storage (NAS) system.

In some embodiments, the database 1108 is integrated within computer system 1085. For example, the computer system 1105 may include one or more hard disk drives as the database 1108. In other embodiments, the database 1108 is external to the computer system 1005 and may be accessed by the computer system 1105 using a storage interface 1130. The storage interface 1130 is any component capable of providing the processor 1115 with access to the database 1108. The storage interface 1130 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1115 with access to the database 1108.

The processor 1115 is configured to facilitate a payment transaction from an issuer account to an acquirer account (merchant account). The processor 1115 is configured to one or more of the functions such as: accessing the information encrypted within the machine-readable code, verifying the certificate and managing the public key-private key relationship between different hardware units, such as the POS terminal 104 and the customer device 106. The processor 1115 is further configured to facilitate the authentication of a customer by verifying a contact number associated with the device 106, PIN/OTP, etc. Thereafter, the processor 1115 is configured to facilitate the payment transaction of the transaction amount from the issuer account of the user to acquirer account of the merchant. The processor 1115 may also be configured to notify the POS terminal 104 and the merchant device 112 of the transaction status via the communication interface 1125.

Figure 12:
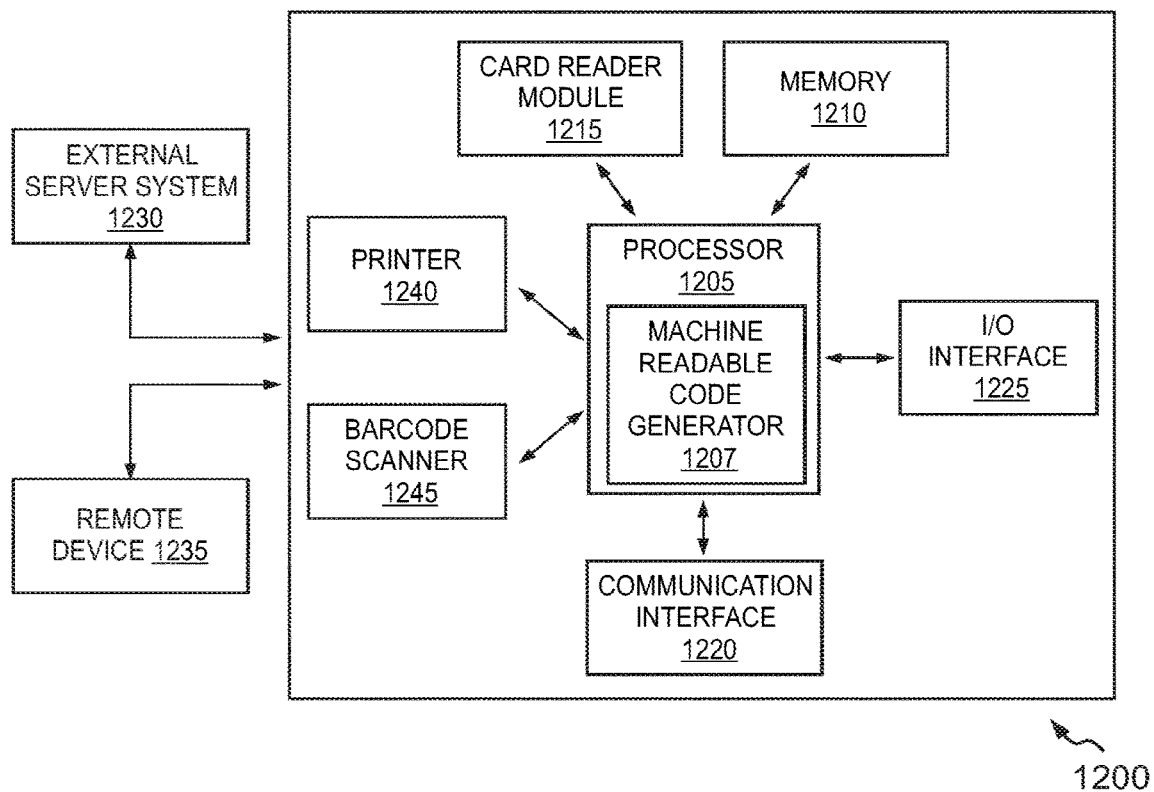
FIG. 12 is a simplified block diagram of a merchant terminal or a POS terminal used for facilitating a payment transaction at the POS terminal, in accordance with one embodiment of the present disclosure.

FIG. 12 is a simplified block diagram of a POS terminal/POS machine 1200 used for payment transactions, in accordance with one embodiment of the present disclosure. The term POS terminal may refer to a system including a host computer with several components such as a POS card reader, a barcode scanner and a receipt printer, among others embodied within the host computer.

The POS terminal 1200 includes at least one processor 1205 operatively communicating with a memory 1210, a card reader module 1215, a communication interface 1220, an Input/Output (I/O) interface 1225, a printer 1240 and a barcode scanner 1245. The components of the POS terminal 1200 provided herein are embodied in the POS terminal 1200. The components provided herein may not be exhaustive, and that the POS terminal 1200 may include more or fewer components than that of depicted in FIG. 12. Further, two or more components may be embodied in one single component, and/or one component may be configured using multiple sub-components to achieve the desired functionalities. Some components of the POS terminal 1200 may be configured using hardware elements, software elements, firmware elements and/or a combination thereof.

The card reader module 1215 executes instructions such as or similar to EMV scripts that allow reading of information from a chip of a payment card. The card reader module 1215 is also configured to read information stored within magnetic stripes provided in some payment cards. There may be as many as two card reader modules in the POS terminal 1200 that each of which may be configured to read information stored in different types of storages, such as chips and magnetic stripes.

The barcode scanner 1245 is an example input interface/device configured to read printed labels on products and packages of products. The barcode scanner 1245 consists of a light source, a lens and a light sensor translating optical impulses into electrical signals. Additionally, the barcode scanner 1245 includes a decoder circuitry analyzing the barcode's image data provided and sending the barcode's content to the scanner's output port. The barcode scanner 1245 can additionally be a device with the likes of a smartphone camera capable of reading labels and codes.

The processor 1205 includes a machine-readable code generator 1207 configured to execute instructions to alter dynamically alter value corresponding to the merchant ID, merchant details and the dynamic token. The processor 1205 further changes patterns of machine-readable codes based on the altered values of the merchant ID, merchant details and the dynamic token. The processor 1205 generates machine-readable codes (QR codes) with changed patterns at predefined intervals as provided in the instructions. In at least one embodiment, the machine-readable code generator 1207 only changes the value of dynamic code, and keep other parts such as the merchant ID, merchant details and unchanged. It is noted that by merely changing the dynamic token, overall machine-readable code becomes dynamic.

The I/O interface 1225 is configured to receive inputs from and provide outputs to the end-user (i.e. the merchant and/or the customer) of the POS terminal 1200. For instance, the I/O interface 1225 may include at least one input interface and/or at least one output interface. Examples of the input interface may include, but are not limited to, a keypad, a touch screen, soft keys and the like. Examples of the output interface may include, but are not limited to, a UI display (such as a light emitting diode display, a thin-film transistor (TFT) display, a liquid crystal display, an active-matrix organic light-emitting diode (AMOLED) display, etc.) and the like. The output interface may be used to display the machine-readable code (QR code).

The printer 1240 is configured to print receipts of the transaction. The receipt includes an acquirer bank name, the transaction amount, merchant name, date on which the receipt is printed and a payment card type, among other information.

The memory 1210 can be any type of storage accessible to the processor 1205. For example, the memory 1210 may include volatile or non-volatile memories, or a combination thereof. In some non-limiting examples, the memory 1210 can be four to sixty four Megabytes (MB) of Dynamic Random Access Memory ("DRAM") or Static Random Access Memory ("SRAM"). In addition, some examples may include supplementary flash memory installed via a PCMCIA slot.

The memory 1210 is capable of storing and/or retrieving data, such as, but not limited to, smart card insertions, user/customer information, merchant information, dynamic tokens, machine-readable code patterns, card swipes, touch-screen key depressions, keypad key depressions, number of dots printed by the slip and roll printers, check read errors, and the like. Such information can be accessed by the processor 1205 using the communication interface 1220 to determine potential future failures and the like.

The POS terminal 1200 is capable of communicating with one or more POS peripheral devices such as the merchant device 1235 (an example of the merchant device 112 of FIG. 1) and external server system 1230 such as an acquirer server (an example of the acquirer server 116 of FIG. 1) via the communication interface 1220 over a communication network (not shown). The merchant device 1235 can provide functionality which is used by a consumer at a merchant facility, such as PIN entry, clear text entry, signature capture, display of texts, and the like. The merchant interface device 1235 may be connected to several peripheral devices including barcode scanners, cash drawers, receipt printers, PIN pads, signature capture devices and the like. In some embodiments, the merchant interface device 1235 may be mounted near a cash register at a check-out counter at a merchant facility, while the POS terminal 1200 may be mounted on the check-out counter such that it is accessible to customers. In this way, both the merchant and the user/customer can interact with similar devices to process the payment transaction.

The communication interface 1220 is further configured to cause display of user interfaces on the POS terminal 1200. In one embodiment, the communication interface 1220 includes a transceiver for wirelessly communicating information to, or receiving information from, the external server system 1230 or other suitable display device, and/or another type of remote processing device. In another embodiment, the communication interface 1220 is capable of facilitating operative communication with the remote devices and a cloud server using Application Program Interface (API) calls. The communication may be achieved over a communication network.

The processor 1205 is capable of sending the payment transaction request received from the end-user via the communication interface 1220 to the external server system 1230 (acquirer server) for processing the payment transaction.

Additionally, the POS terminal 1200 can include an operating system and various software applications that can provide various functionalities to the POS terminal 1200.

For example, in some embodiments, the POS terminal 1200 is addressable with an Internet protocol and includes an application. In such embodiments, the processor 1205 includes software adapted to support such functionality. In some embodiments, the processor 1205 executes software to support network management. In particular, this capacity allows software to be downloaded to a plurality of such systems to provide new applications such as application for various possible payment methods using POS terminals and/or updates to existing applications. The operating system and software application upgrades are distributed and maintained through communication to the POS terminal 1200 over a communication network.

Figure 13:
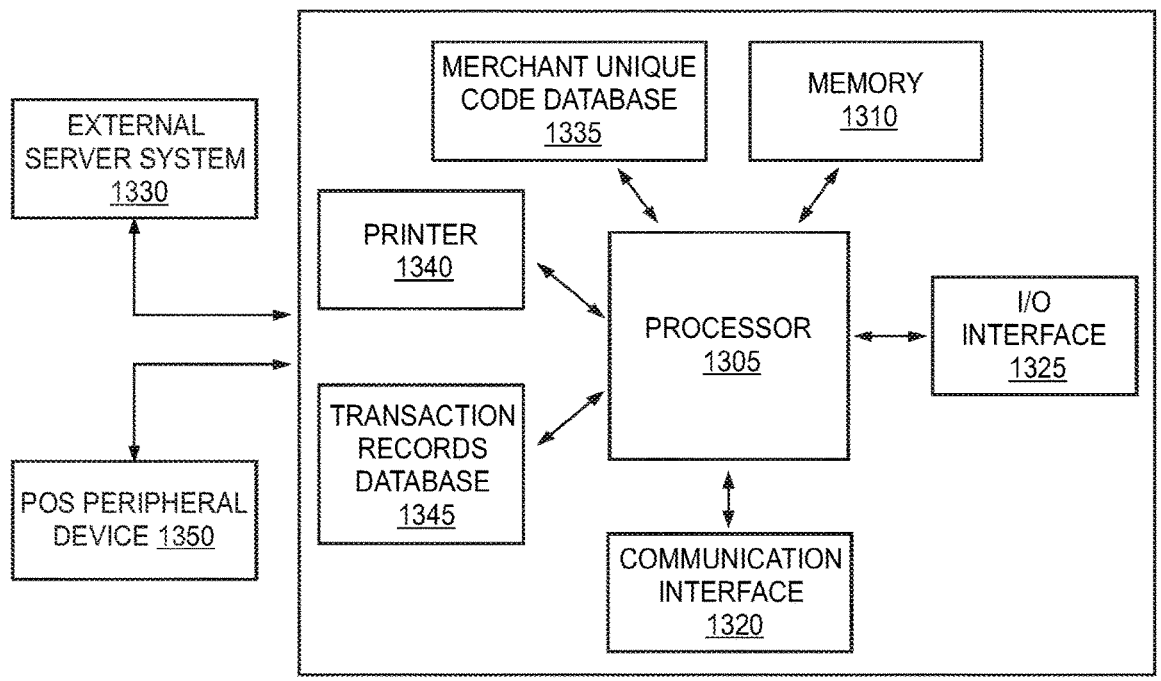
FIG. 13 is a simplified block diagram of a merchant device used for facilitating a payment transaction at the POS terminal, in accordance with one embodiment of the present disclosure.

FIG. 13 is a simplified block diagram of a merchant device 1300 used for payment transactions, in accordance with one embodiment of the present disclosure. The merchant device 1300 as explained herein is only one example of the merchant device 112. In various embodiments, the merchant device 112 can be a merchant mobile phone, a kiosk, a PDA, a merchant facilitated e-commerce website interface running on a computing device and the like. The merchant device 1300 includes at least one processor 1305 communicably coupled to a memory 1310, an Input/Output (I/O) interface 1325, and a communication interface 1320. The merchant device 1300 further comprises a merchant unique code database 1335 and a transaction records database 1345. The components of the merchant device 1300 provided herein may not be exhaustive, and that the merchant device 1300 may include more or fewer components than that of depicted in FIG. 13. Further, two or more components may be embodied in one single component, and/or one component may be configured using multiple sub-components to achieve the desired functionalities. Some components of the merchant device 1300 may be configured using hardware elements, software elements, firmware elements and/or a combination thereof.

The I/O interface 1325 is configured to receive inputs from and provide outputs to the end-user (i.e. the merchant and/or the customer) of the POS terminal 1200. For instance, the I/O interface 1325 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The memory 1310 can be any type of storage accessible to the processor 1305. For example, the memory 1310 may include volatile or non-volatile memories, or a combination thereof. In some non-limiting examples, the memory 1310 can be four to sixty four MegaBytes (MB) of Dynamic Random Access Memory ("DRAM") or Static Random Access Memory ("SRAM"). In addition, some examples may include supplementary flash memory installed via a PCMCIA slot.

The merchant unique code database 1335 is capable of storing and/or retrieving data from an acquirer server (such as the acquirer server 116), such as, but not limited to, merchant defined transaction codes for various natures of transactions. Some examples of transactions include 'authentication', 'purchase', 'void', 'refund', 'pay with cashback', among others. A merchant defined transaction code is assigned to each of the different natures of transaction. As an example, a transaction type 'authentication' can be defined by a transaction code '11', a transaction type 'purchase' can be defined by a transaction code '12', a transaction type 'void' can be defined by a transaction code '14' and so on.

The transaction records database 1345 is capable of storing and/or retrieving data from an acquirer server (such as the acquirer server 116), such as, but not limited to, merchant transaction history. Such data may include, transaction IDs, merchant IDs, POSIDs, customer information, etc.

The merchant device 1300 is capable of communicating with one or more POS peripheral devices 1350 such as the POS terminal 1200 (an example of the POS terminal 104 of FIG. 1) and external server system 1330 such as an acquirer server (an example of the acquirer server 116 of FIG. 1) via the communication interface 1320 over a communication network 110 of FIG. 1. Some non-exhaustive examples of the peripheral device 1350 include POS card reader device, barcode scanner, cash drawer, receipt printer, PIN pad, fingerprint input module or fingerprint sensor, signature capture device, touchscreen, keyboard, portable data terminal, customer pole display and the like.

In some embodiments, the merchant device 1300 may be mounted near a cash register at a check-out counter in merchant facility, while the POS peripheral device 1335 may be mounted on the check-out counter such that it is accessible to the users. In this way, both the merchant and the user/customer can interact with these devices to process the payment transaction.

The processor 1305 is capable of sending the payment transaction request received from the end-user via the communication interface 1320 to the external server system 1330 (acquirer server) for processing the payment transaction. The processor 1305 can access the database 1350 to retrieve the user information and merchant information that are required to be sent along with the payment transaction request to the external server system 1330.

Additionally, the merchant device 1300 can include an operating system and various software applications that can provide various functionality to the merchant device 1300. For example, in some embodiments, the merchant device 1300 is addressable with an Internet protocol and includes a browser application. In such embodiments, the processor 1305 includes software adapted to support such functionality. In some embodiments, the processor 1305 executes software to support network management. In particular, this capacity allows software to be downloaded to a plurality of such systems to provide new applications. The operating system and software application upgrades are distributed and maintained through communication to the merchant device 1300 over the communication network 110.

Figure 14:
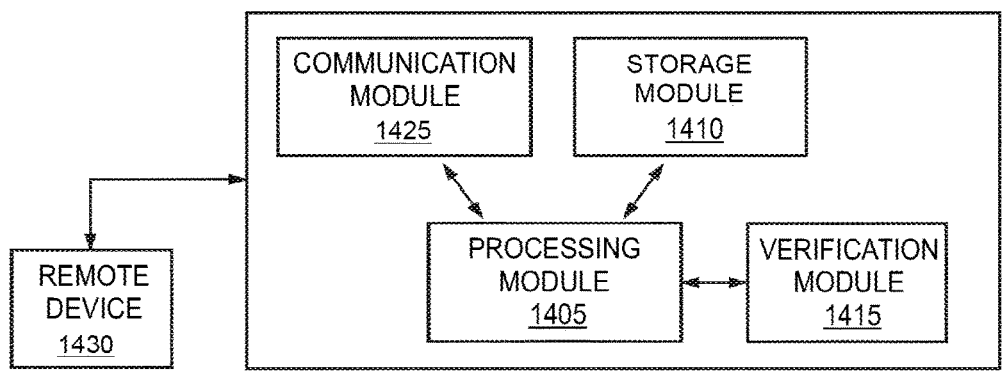
FIG. 14 is a simplified block diagram of an issuer server for facilitating a payment transaction at the POS terminal, in accordance with one embodiment of the present disclosure.

FIG. 14 is a simplified block diagram of an issuer server 1400 used for facilitating a payment transaction at a POS terminal, in accordance with one embodiment of the present disclosure. The issuer server 1400 is an example of the issuer server 114 of FIG. 1, or may be embodied in the issuer server 114. The issuer server 1400 is associated with an issuer bank/issuer, in which a customer may have an account, which provides a payment card. The issuer server 1400 includes a processing module 1405 operatively coupled to a storage module 1410, a verification module 1415 and a communication module 1425. The components of the issuer server 1400 provided herein may not be exhaustive and that the issuer server 1400 may include more or fewer components than that of depicted in FIG. 14. Further, two or more components may be embodied in one single component, and/or one component may be configured using multiple sub-components to achieve the desired functionalities. Some components of the issuer server 1400 may be configured using hardware elements, software elements, firmware elements and/or a combination thereof.

The storage module 1410 is configured to store machine executable instructions to be accessed by the processing module 1405. Additionally, the storage module 1410 stores information related to, contact information of the customer, bank account number, availability of funds in the account, payment card details, transaction related information of customers, and/or the like. This information is retrieved by the processing module 1405 for validation during machine-readable script generation.

The processing module 1405 is configured to communicate with one or more remote devices such as a remote device 1430 using the communication module 1425 over a network such as the payment network 110 of FIG. 1. The examples of the remote device 1430 include the POS terminal 104, the payment server 118, the acquirer server 116, and the customer device 106 or other computing systems of issuer and the payment network 120 and the like. The communication module 1425 is capable of facilitating such operative communication with the remote devices and cloud servers using API (Application Program Interface) calls. The communication module 1425 is configured to receive payment transaction request from the customer device 106 via the payment network 120. The communication module 1425 is configured to send notification of approval or decline of a transaction to the POS terminal 104 and the customer device 106 via the payment network 120.

The verification module 1415 is configured to verify and validate a customer (such as the customer 102) and the customer device 106 associated with the customer for approving the payment transaction. The verification module 1415 may also verify if an issuer account of the customer associated with payment card have good standing balance.

Figure 15:
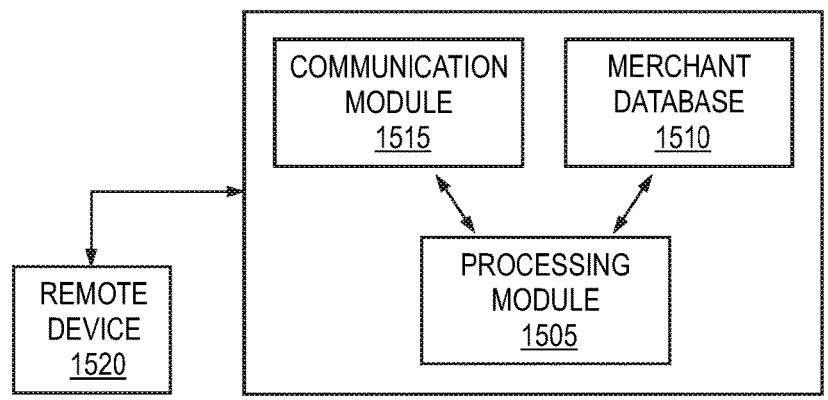
FIG. 15 is a simplified block diagram of an acquirer server for facilitating a payment transaction at the POS terminal, in accordance with one embodiment of the present disclosure.

FIG. 15 is a simplified block diagram of an acquirer server 1500 used for facilitating a payment transaction at a POS terminal, in accordance with one embodiment of the present disclosure. The acquirer server 1500 is associated with an acquirer bank, which may be associated with a merchant at whose facility the customer 102 is purchasing items. The merchant may have established an account to accept payment for purchase of items from customers. The acquirer server 1500 is an example of the acquirer server 116 of FIG. 1 or may be embodied in the acquirer server 116. Further, the acquirer server 1500 is configured to facilitate payment transaction with the issuer server 1400 using a payment network, such as the payment network 120 of FIG. 1. The acquirer server 1500 includes a processing module 1505 communicably coupled to a merchant database 1510 and a communication module 1515. The components of the acquirer server 1500 provided herein may not be exhaustive, and that the acquirer server 1500 may include more or fewer components than that of depicted in FIG. 15. Further, two or more components may be embodied in one single component, and/or one component may be configured using multiple sub-components to achieve the desired functionalities. Some components of the acquirer server 1500 may be configured using hardware elements, software elements, firmware elements and/or a combination thereof.

The merchant database 1510 includes one or more merchant parameters, such as, but not limited to, a merchant primary account number (PAN), a merchant name, a merchant ID (MID), a merchant category code (MCC), a merchant city, a merchant postal code, an MAID, a merchant brand name, terminal identification numbers (TIDs) associated with merchant terminals (e.g., the POS terminals or any other merchant electronic devices) used for processing transactions. The processing module 1505 is configured to use the MID or any other merchant parameter such as the merchant PAN to identify the merchant during the normal processing of payment transactions, adjustments, chargebacks, end-of-month fees, loyalty programs associated with the merchant and so forth. The processing module 1505 may be configured to store and update the merchant parameters in the merchant database 1510 for later retrieval. In an embodiment, the communication module 1515 is capable of facilitating operative communication with a remote device 1520.

Figure 16:
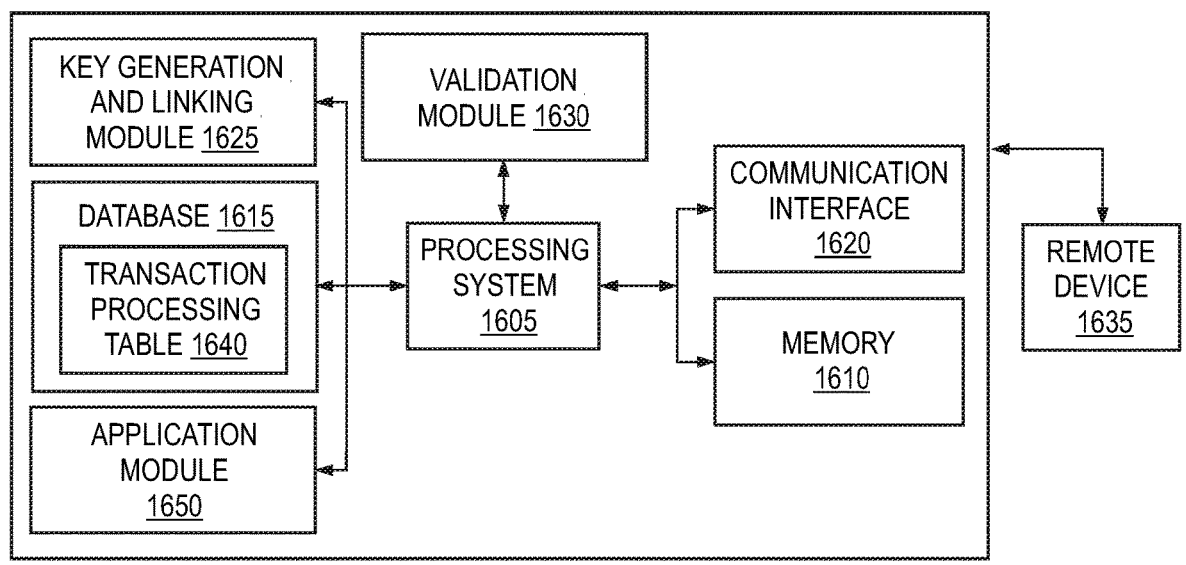
FIG. 16 is a simplified block diagram of a payment server for facilitating a payment transaction at the POS terminal, in accordance with one embodiment of the present disclosure.

FIG. 16 is a simplified block diagram of a payment server 1600 used for facilitating a payment transaction at a POS terminal, in accordance with one embodiment of the present disclosure. The payment server 1600 may correspond to payment server 118 of FIG. 1. The payment network 120 may be used by the payment server 1600, the issuer server 1400 and the acquirer server 1500 as a payment interchange network. Examples of payment interchange network include, but not limited to, Mastercard® payment system interchange network. The payment server 1600 includes a processing system 1605 configured to extract programming instructions from a memory 1610 to provide various features of the present disclosure. The components of the payment server 1600 provided herein may not be exhaustive and that the payment server 1600 may include more or fewer components than that of depicted in FIG. 16. Further, two or more components may be embodied in one single component, and/or one component may be configured using multiple sub-components to achieve the desired functionalities. Some components of the payment server 1600 may be configured using hardware elements, software elements, firmware elements and/or a combination thereof.

Via a communication interface 1620, the processing system 1605 receives the payment transaction request from a remote device 1635 such as the customer device 106, the merchant device 112, the acquirer server 1500 or the POS terminal 1200. The communication may be achieved through API calls, without loss of generality. A transaction processing table 1640 is embodied in a database 1615. The transaction processing table 1640 stores details such as Issuer ID, POS ID, country code, acquirer ID, and Merchant ID, among others. Upon receiving the payment transaction request, the payment server 1600 may perform a lookup into the transaction processing table 1640 to identify the authenticity of the POS terminal and the Merchant ID. The transaction processing table 1640 also stores the customer parameters and payment details, acquirer account information, transaction records, merchant account information, and the like.

The customer details, the payment details, the issuer account balance, etc., are validated using a validation module 1630. The validation module 1630 may include one or more predefined rule sets using which the processing system 1605 can process the validation. Further, the processing system 1605, upon successful validation, sends transaction amount and the merchant parameters to the acquirer server 1600 for crediting the merchant account with the transaction amount. The processing system 1605 is further configured to notify the remote device 1635 of the transaction status via the communication interface 1620. An application module 1650 may facilitate a dedicated application capable of being installed on the customer device 106 for performing the transaction.

The key generation and linking module 1625 manages a certificate based on which the POS terminal 104 and the customer device 106 are in synchronization. The module 1625 further manages a public key-private key relationship. A public key validated by the server system associated with the certificate is provided to the POS terminal 104 and a private key validated by the server system associated with the certificate is provided to the dedicated application installed at the user device. Interaction between the public key and the private key validates the transaction at the POS terminal 104.

Figure 17:
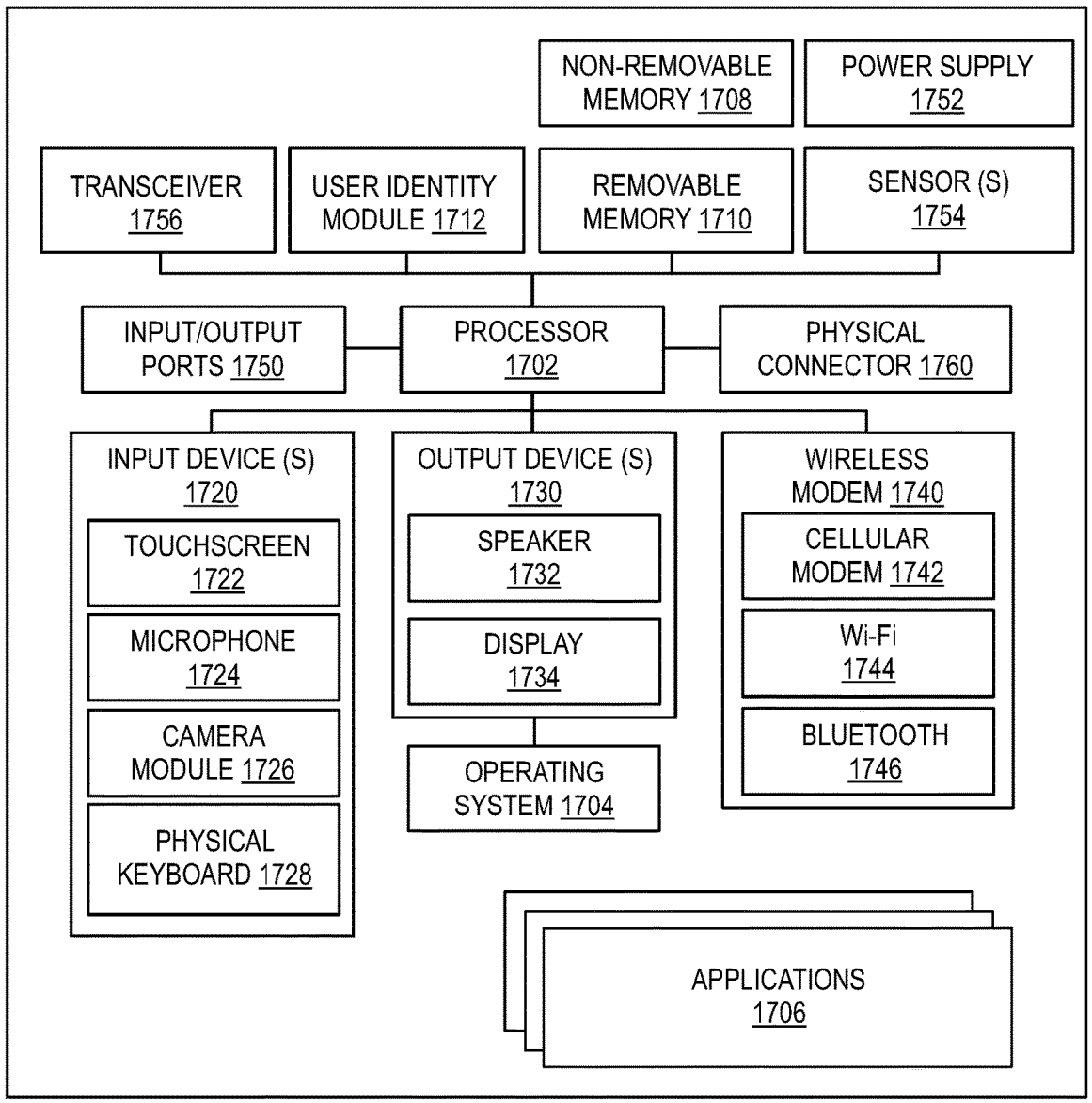
FIG. 17 shows simplified block diagram of a user device, for example, a mobile phone capable of implementing at least some embodiments of the present disclosure.

FIG. 17 shows simplified block diagram of a customer device 1700 (such as the customer device 106). The customer device 1700, for example, can be a desktop computer or a mobile phone capable of implementing the various embodiments of the present disclosure. The customer device 1700 is depicted to include one or more applications 1706 managed by the payment server 1600.

It should be understood that the customer device 1700 as illustrated and hereinafter described is merely illustrative of one type of device and should not be taken to limit the scope of the embodiments. As such, it should be appreciated that at least some of the components described below in connection with that the customer device 1700 may be optional and thus in an example embodiment may include more, less or different components than those described in connection with the example embodiment of the FIG. 17. As such, among other examples, the customer device 1700 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated customer device 1700 includes a controller or a processor 1702 (e.g., a signal processor, microprocessor, ASIC, or other control and processing logic circuitry) for performing such tasks as signal coding, data processing, image processing, input/output processing, power control, and/or other functions. An operating system 1704 controls the allocation and usage of the components of the customer device 1700 and support for one or more applications programs (see, payment server application 1706), that implements one or more of the innovative features described herein. The applications 1706 may include common mobile computing applications (e.g., telephony applications, email applications, calendars, contact managers, web browsers, messaging applications such as USSD messaging or SMS messaging or SIM Tool Kit (STK) application) or any other computing application.

The illustrated customer device 1700 includes one or more memory components, for example, a non-removable memory 1708 and/or removable memory 1710. The non-removable memory 1708 and/or removable memory 1710 may be collectively known as database in an embodiment. The non-removable memory 1708 can include RAM, ROM, flash memory, a hard disk, or other well-known memory storage technologies. The removable memory 1710 can include flash memory, smart cards, or a Subscriber Identity Module (SIM). The one or more memory components can be used for storing data and/or code for running the operating system 1704 and the applications 1706. The merchant device 1700 may further include a user identity module (UIM) 1712. The UIM 1712 may be a memory device having a processor built in. The UIM 1712 may include, for example, a subscriber identity module (SIM), a universal integrated circuit card (UICC), a universal subscriber identity module (USIM), a removable user identity module (R-UIM), or any other smart card. The UIM 1712 typically stores information elements related to a mobile subscriber. The UIM 1712 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The customer device 1700 can support one or more input devices 1720 and one or more output devices 1730. Examples of the input devices 1720 may include, but are not limited to, a touch screen/a display screen 1722 (e.g., capable of capturing finger tap inputs, finger gesture inputs, multi-finger tap inputs, multi-finger gesture inputs, or keystroke inputs from a virtual keyboard or keypad), a microphone 1724 (e.g., capable of capturing voice input), a camera module 1726 (e.g., capable of capturing still picture images and/or video images) and a physical keyboard 1728. Examples of the output devices 1730 may include, but are not limited to a speaker 1732 and a display 1734. Other possible output devices can include piezoelectric or other haptic output devices. Some devices can serve more than one input/output function. For example, the touch screen 1722 and the display 1734 can be combined into a single input/output device.

A wireless modem 1740 can be coupled to one or more antennas (not shown in the FIG. 17) and can support two-way communications between the processor 1702 and external devices, as is well understood in the art. The wireless modem 1740 is shown generically and can include, for example, a cellular modem 1742 for communicating at long range with the mobile communication network, a Wi-Fi compatible modem 1744 for communicating at short range with an external Bluetooth-equipped device or a local wireless data network or router, and/or a Bluetooth-compatible modem 1746. The wireless modem 1740 is typically configured for communication with one or more cellular networks, such as a GSM network for data and voice communications within a single cellular network, between cellular networks, or between the customer device 1700 and a public switched telephone network (PSTN).

The customer device 1700 can further include one or more input/output ports 1750 for establishing connection with peripheral devices including the POS terminal 1200, a power supply 1752, one or more sensors 1754 for example, an accelerometer, a gyroscope, a compass, or an infrared proximity sensor for detecting the orientation or motion of the customer device 1700 and biometric sensors for scanning biometric identity of an authorized user, a transceiver 1756 (for wirelessly transmitting analog or digital signals) and/or a physical connector 1760, which can be a USB port, IEEE 1294 (FireWire) port, and/or RS-232 port. The illustrated components are not required or all-inclusive, as any of the components shown can be deleted and other components can be added.

Without in any way limiting the scope, interpretation, or application of the claims appearing below, a technical effect of one or more of the example embodiments disclosed herein is to provide computer implemented methods and server systems for facilitating a payment transaction carried out at a POS terminal. The system provides a server system a mobile application installed at a customer's device capable of scanning a machine-readable code displayed at the POS terminal and dynamically changing machine-readable codes. The POS terminal is configured to dynamically generate new machine-readable codes at pre-defined intervals. The information encrypted within the code is altered thereby causing generation of machine-readable codes with new patterns at pre-defined intervals. Dynamically changing the machine-readable code at pre-defined intervals makes the information encrypted within the machine-readable code difficult to intercept on event of a POS terminal attack.

The disclosed methods with reference to FIGS. 1 to 17, or one or more operations of the flow diagram 1000 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1100 (e.g. servers 114, 116 and 118) and its various components such as the computer system 1105 and the database 1108 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method for controlling data during a payment transaction to prevent fraud, the method comprising:
   generating, a point of sale (POS) terminal, a machine-readable code, wherein:
   the machine-readable code encrypts information comprising a merchant ID, merchant details, and a dynamic token,
   the dynamic token is representative of a certificate validation indicating that a customer device and the POS terminal are linked based on a pair of encryption keys, and
   the POS terminal executes instructions changing the information encrypted within the dynamic token at pre-defined intervals resulting in generation of a new dynamic token at each given pre-defined interval;
   displaying, the POS terminal, the machine-readable code comprising the merchant ID, the merchant details, and a dynamic token to a customer;
   scanning, by an application in the customer device, a machine-readable code comprising the merchant ID, the merchant details, and the dynamic token, wherein:

the application is associated with a default payment card of the customer, and the customer enters a transaction amount associated with the payment transaction in a field presented at an interface of the application;

verifying, by the POS terminal, that the customer device scanning the machine-readable code is linked to the POS terminal on basis of validated pair of encryption keys;

sending, by the customer device, the scanned machine-readable code and the transaction amount to a payment server;

sending, by the payment server, a notification to a merchant device, wherein the notification includes the scanned machine-readable code and the transaction amount received from the customer device;

verifying, by the merchant device, that the scanned machine-readable code received from the payment server matches the machine-readable code displayed to the customer;

based on the verified match of the scanned machine-readable code and the displayed machine-readable code, sending, by the merchant device, a purchase request to the payment server, wherein the purchase request includes a merchant defined transaction code and the transaction amount;

validating, by the payment server, the purchase request;

sending, by the payment server, a payment transaction request to an issue server, wherein the payment transaction request includes the transaction amount and merchant parameters; and completing, by the issue server, the payment transaction by processing the payment transaction and crediting a merchant account with the transaction amount.

2. The method as claimed in claim 1, further comprising:
managing, by the payment server, the application; and
enabling, by the payment server, a payment option in the application.

3. The method as claimed in claim 2, further comprising:
managing, by the payment server, a validated pair of encryption keys for linking the POS terminal and the customer device; and
managing, by the payment server, a certificate for validating the pair of encryption keys.

4. The method as claimed in claim 3, further comprising:
validating, by the payment server, the payment transaction at the POS terminal by facilitating an interaction between the validated pair of encryption keys.

5. The method as claimed in claim 1, wherein the machine-readable code is a quick response (QR) code, and wherein the QR code is generated with a new pattern upon generating the new dynamic token at the given pre-defined interval.

6. The method as claimed in claim 1, wherein the merchant defined transaction code indicates the payment transaction to be at least one of: an authentication transaction, a purchase transaction, a refund transaction, a void transaction, and a purchase with cashback transaction.

7. A payment server for controlling data during a payment transaction to prevent fraud, the payment server comprising:
a memory comprising stored instructions; and
a processor configured to execute the stored instruction and thereby cause the payment server to:
receive a scanned machine-readable code and a transaction amount from a customer device, wherein:

a point of sale (POS) terminal generates a machine-readable code by encrypting information comprising a merchant ID, merchant details, and a dynamic token, the dynamic token is representative of a certificate validation indicating that the customer device and the POS terminal are linked based on a pair of encryption keys, the POS terminal executes instructions changing the information encrypted within the dynamic token at pre-defined intervals resulting in generation of a new dynamic token at each given pre-defined interval, the POS terminal displays the machine-readable code to a customer, and an application in the customer device scans the displayed machine readable code, and the application is associated with a default payment card of a customer, and the customer enters the transaction amount associated with the payment transaction in a field presented at an interface of the application;

send a notification to a merchant device, wherein the notification includes the scanned machine-readable code and the transaction amount received from the customer device; and receive a purchase request from the merchant device, wherein:
the purchase request includes a merchant defined transaction code and the transaction amount, and
the merchant device has verified that the scanned machine-readable code received from the payment server matches the machine-readable code displayed to the customer;

validate the purchase request; and send a payment transaction request to an issuer server, wherein:
the payment transaction request includes the transaction amount and merchant parameters, and
after receiving the payment transaction request, the issue server completes the payment transaction by processing the payment transaction and crediting a merchant account with the transaction amount.

8. The payment server as claimed in claim 7, wherein the payment server is further caused to:
manage the application; and
enable a payment option in the application.

9. The payment server as claimed in claim 8, wherein the payment server is further caused to:
manage a validated pair of encryption keys for linking the POS terminal and the customer device; and
manage a certificate for validating the pair of encryption keys.

10. The payment server as claimed in claim 9, wherein the payment server is further caused to:
validate the payment transaction at the POS terminal by facilitating an interaction between the validated pair of encryption keys.

11. The payment server as claimed in claim 7, wherein the machine-readable code is a quick response (QR) code, and wherein the QR code is generated with a new pattern upon generating the new dynamic token at the given pre-defined interval.

12. The payment server as claimed in claim 7, wherein the POS terminal verifies that the customer device scanning the machine-readable code is linked to the POS terminal on basis of a validated pair of encryption keys.

13. The payment server as claimed in claim 7, wherein the merchant defined transaction code indicates the payment transaction to be at least one of: an authentication transaction, a purchase transaction, a refund transaction, a void transaction, and a purchase with cashback transaction.

14. A point of sale (POS) terminal for controlling data during a payment transaction to prevent fraud, the POS terminal comprising:
a memory comprising stored instructions; and
a processor executing the stored instructions and thereby causing the POS terminal to:
generate a machine-readable code, wherein:
the machine-readable code encrypts information comprising a merchant ID, merchant details, and a dynamic token, and
the dynamic token is representative of a certificate validation indicating that a customer device and the POS terminal are linked based on a pair of encryption keys;
execute instructions changing the information encrypted within the dynamic token at pre-defined intervals resulting in generation of a new dynamic token at each given pre-defined interval; and
display the machine-readable code to a customer, wherein:
the machine-readable code is scanned by an application in the customer device,
the application is associated with a default payment card of the customer, and the customer enters a transaction amount associated with the payment transaction in a field presented at an interface of the application,
the customer device sends the scanned machine-readable code and the transaction amount to a payment server,
the payment server sends a notification that includes the scanned machine-readable code and the transaction amount received from the customer device to a merchant device,
the merchant device verifies that the scanned machine-readable code received from the payment server matches the machine-readable code displayed to the customer,
based on the verified match of the scanned machine-readable code and the displayed machine-readable code, the merchant device sends a purchase request including a merchant defined transaction code and the transaction amount to the payment server,
the payment server validates the purchase request and sends a payment transaction request including the transaction amount and merchant parameters to an issue server, and
the issue server completes the payment transaction by processing the payment transaction and crediting a merchant account with the transaction amount.

15. The POS terminal as claimed in claim 14, wherein the machine-readable code is a quick response (QR) code, and wherein the QR code is generated with a new pattern upon generating the new dynamic token at the given pre-defined interval.

16. The POS terminal as claimed in claim 14, wherein the POS terminal is further caused to:
verify that the customer device scanning the machine-readable code is linked to the POS terminal on basis of a validated pair of encryption keys.

17. The POS terminal as claimed in claim 14, wherein the payment server manages the application, and wherein the payment server enables a payment option in the application.

18. The POS terminal as claimed in claim 16, wherein the payment server manages the validated pair of encryption keys for linking the POS terminal and the customer device, and wherein the payment server manages a certificate for validating the pair of encryption keys.

19. The POS terminal as claimed in claim 14, wherein the payment server validates the payment transaction at the POS terminal by facilitating an interaction between a validated pair of encryption keys.

20. The POS terminal as claimed in claim 14, wherein the merchant defined transaction code indicates the payment transaction to be at least one of: an authentication transaction, a purchase transaction, a refund transaction, a void transaction, and a purchase with cashback transaction.

\* \* \* \* \*